(12) United States Patent
Morikazu et al.

(10) Patent No.: US 6,915,895 B2
(45) Date of Patent: Jul. 12, 2005

(54) CONTAINER GROUP DELIVERY MECHANISM, AND EQUIPMENT AND METHOD FOR TRANSPORTING CONTAINER

(75) Inventors: Shunji Morikazu, Nagaokakyo (JP); Kenju Nagaoka, Osaka (JP); Shinji Konishi, Muko (JP)

(73) Assignee: Suntory Limited, Osaka (JP)

( * ) Notice: Subject to any disclaimer, the term of this patent is extended or adjusted under 35 U.S.C. 154(b) by 107 days.

(21) Appl. No.: 10/149,831
(22) PCT Filed: Oct. 18, 2001
(86) PCT No.: PCT/JP01/09165
§ 371 (c)(1), (2), (4) Date: Jul. 3, 2002
(87) PCT Pub. No.: WO02/32796
PCT Pub. Date: Apr. 25, 2002

(65) Prior Publication Data
US 2003/0102201 A1 Jun. 5, 2003

(30) Foreign Application Priority Data

Oct. 19, 2000 (JP) .................................. 2000-319261
Jul. 23, 2001 (JP) .................................. 2001-221541
Jul. 23, 2001 (JP) .................................. 2001-221542

(51) Int. Cl.$^7$ .............................................. B65G 29/00
(52) U.S. Cl. ........................ 198/468.11; 198/468.9; 414/797.4; 414/789
(58) Field of Search ..................... 198/468.9, 468.11, 198/429, 432, 433; 414/789, 789.1, 789.7, 789.9, 790.3, 790.6, 794.7

(56) References Cited

U.S. PATENT DOCUMENTS

| 3,777,903 A | * | 12/1973 | Kuckhermann .............. 414/789 |
| 5,069,598 A | * | 12/1991 | Kleinhen et al. ........ 198/468.9 |
| 5,310,307 A | | 5/1994 | VanderMeer et al. |
| 5,489,016 A | * | 2/1996 | Welch .................... 198/468.11 |
| 5,733,100 A | * | 3/1998 | Slat et al. ................ 414/791.7 |
| 5,902,092 A | * | 5/1999 | Erlandson et al. ....... 414/797.4 |

FOREIGN PATENT DOCUMENTS

| EP | 0 610 780 A1 | 8/1994 |
| JP | 58-43526 | 3/1983 |
| JP | 58-203382 A | 11/1983 |
| JP | 59-134122 A | 8/1984 |

\* cited by examiner

Primary Examiner—James R. Bidwell
(74) Attorney, Agent, or Firm—Fulbright & Jaworski L.L.P.

(57) ABSTRACT

An air conveyer receives an uppermost container group elevated by a lift device and transporting the container group horizontally. A pushing device is provided for pushing the uppermost container group onto the adjacent airflow conveyer by contacting the container group at one side thereof and moving horizontally toward the other side. A forward-fall preventive device is provided to be switchable between a closed state for lying forwardly in a pushing direction of the container group, as the pushing device moves horizontally, to be capable of preventing a forward fall of containers, and an open state for opening a forward position in the pushing direction of the container group when the container group rides the airflow conveyer to enable a discharge of the container group. A speed varying mechanism is provided for varying a relative speed between a transport speed of the airflow conveyer and a pushing speed of the pushing device.

17 Claims, 19 Drawing Sheets

FIG.16
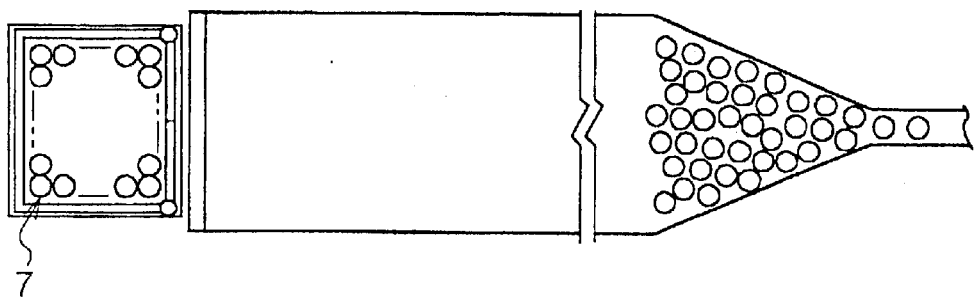
(a)
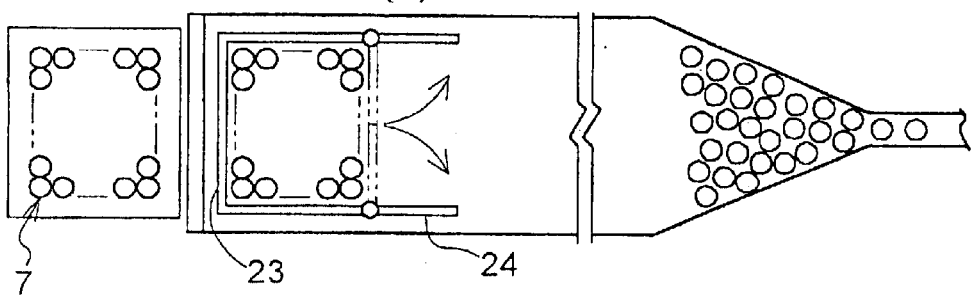
(b)
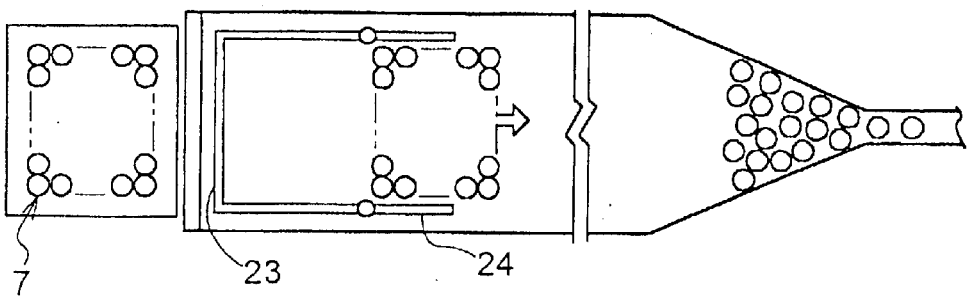
(c)
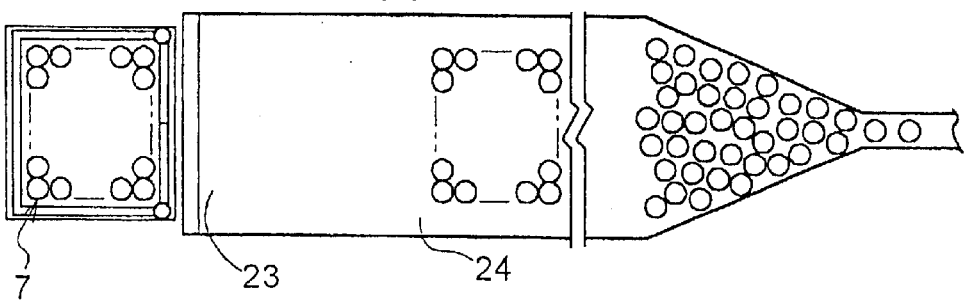
(d)

FIG.22
(a)
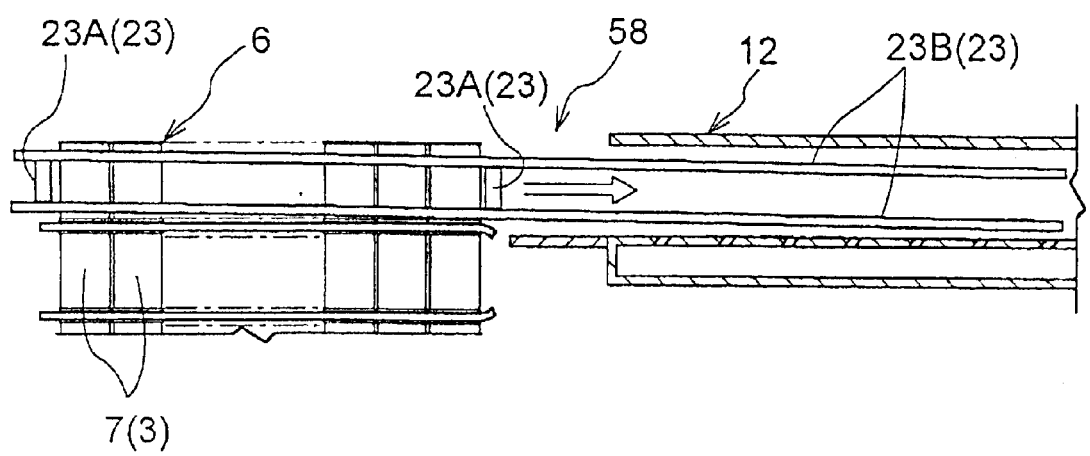
(b)
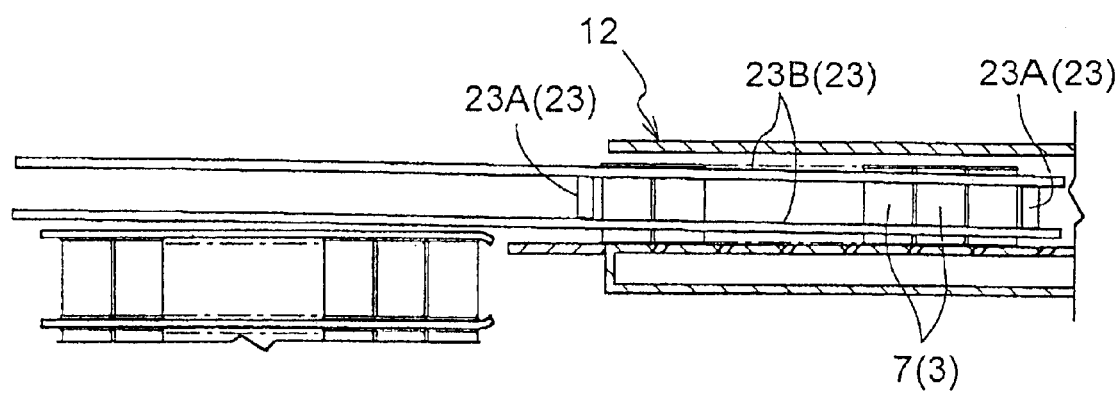

CONTAINER GROUP DELIVERY MECHANISM, AND EQUIPMENT AND METHOD FOR TRANSPORTING CONTAINER

TECHNICAL FIELD

The present invention relates to a container group transfer mechanism having a pushing device for horizontally pushing a container group including a plurality of standing containers arranged and collected in a horizontal direction, by contacting the container group at one side thereof and moving horizontally toward the other side, and a forward-fall preventive device switchable between a closed state for contacting a forward end in a pushing direction of the container group to be capable of preventing a forward fall of the containers by lying at the forward end in the pushing direction of the container group as the pushing device moves horizontally, and an open state for opening a forward position in the pushing direction of the container group to enable a discharge of the container group, and relates also to container transporting equipment having such a container group transfer mechanism.

Such container transporting equipment includes a lift device for vertically stacking in stages a plurality of container groups each including a plurality of standing containers arranged and collected in a horizontal direction, and carrying and elevating, stage by stage, the plurality of container groups stacked vertically, a conveyer disposed adjacent this lift device for receiving an uppermost container group elevated by the lift device and transporting the container group horizontally, and a container group transfer mechanism having a pushing device for pushing the uppermost container group onto the conveyer by contacting the container group at one side thereof and moving horizontally toward the other side, and a forward-fall preventive device switchable between a closed state for lying forwardly in a pushing direction of the container group, as the pushing device moves horizontally, to be capable of preventing a forward fall of said containers, and an open state for opening a forward position in the pushing direction of the container group when the container group rides the conveyer to enable a discharge of the container group.

Further, the invention relates also to a method for use with such a container group transfer mechanism and container transporting equipment.

BACKGROUND ART

In a production process of beverages such as beer and soft drinks, for example, containers of the beverages are delivered on pallets and removed from the pallets stage by stage. A plurality of containers are transported as groups. As shown in FIG. 16, a funnel-like single row transport path ultimately turns the containers into a single row for a filling machine to fill the contents. Equipment for transporting such containers from pallets vertically stacks in stages a plurality of container groups each including a plurality of standing containers arranged and collected in a horizontal direction, carries and elevates, stage by stage, the plurality of container groups stacked vertically by means of a lift device, receives an uppermost container group elevated by the lift device, moves the group horizontally by a pushing device onto an adjacent airflow conveyer, switches a forward-fall preventive device to an open state to discharge the container group onto the airflow conveyer, and transports the discharged containers by the airflow conveyer to a next process. The movement from the lift device to the airflow conveyer is executed by what is known as a container group transfer mechanism.

As shown in FIGS. 19 and 20, for example, this type of container group transfer mechanism 2 conventionally employs a construction having a frame 190a with props 190b erected thereon, and a forward-fall preventive device 24 having arms 191a disposed at opposite ends thereof and pivotally supported by the props 190b, whereby the forward-fall preventive device 24 is vertically pivotable to open and close.

[First Problem to be Solved by the Invention]

According to the container group transfer mechanism constructed to be vertical pivotable to open and close, a container group 4 may be moved reliably from the pallet to the conveyer. However, it is necessary to secure a space for movement of the props 190b occurring with the horizontal movement of the container group transfer mechanism 2, and a retraction space for allowing the forward-fall preventive device 24 to retract forwardly and above the container group transfer mechanism 2 when switched to the open state for discharging the container group.

Currently, in the beverage production process, the container transport is effected at high speed and various containers are transported. The containers tumble or become damaged on the conveyer. However, the conventional container group transfer mechanism 2 has problems not only that it is impossible to accommodate, in a space above said receiving device, for example, a monitoring instrument for monitoring a state of the container group transferred to said receiving device, or a device of different function such as a container tumbling preventive mechanism, but that it is impossible to use a conveyer such as an airflow conveyer having an upper guide for tumble preventing purposes.

A first object of the present invention is to provide a container group transfer mechanism capable of allowing, for example, a monitoring instrument or a device of different function such as a container tumbling preventive mechanism to be disposed in a space above the container group transfer mechanism, or capable of using container transporting equipment with a tumbling preventive upper guide, and container transporting equipment.

[Second Problem to be Solved by the Invention]

In the container transporting equipment which receives, in the container group transfer mechanism, the uppermost container group elevated by said lift device, transports it onto the adjacent conveyer by horizontal movement, discharges said container group onto said conveyer by opening the forward-fall preventive device, thereafter moves said container group transfer mechanism back onto said lift, and repeats the above process again to receive a next container group, where an arrangement is employed to receive the next container group after moving said container group transfer mechanism back onto said lift device and closing the forward-fall preventive device, the time until said forward-fall preventive device is closed and the time from the closure of said forward-fall preventive device until the next container group is received are required separately, thus a long time is taken to receive the container group, resulting in a low container transporting efficiency.

Then, where an arrangement is employed to receive the next container by the time said forward-fall preventive device is closed, the closure of said forward-fall preventive device and reception of the next container group may be carried out simultaneously to shorten the time taken to receive the container group and to improve the container transporting efficiency container. At this time, however, there occurs a risk that, when an operation is performed to close said forward-fall preventive device, said forward-fall preventive device swings to excess under inertia, instead of stopping in home position, and strikes, with impact, the container received in said container group transfer mechanism, thereby damaging said containers.

A second object of the present invention is to employs a container group transfer mechanism in which said forward-fall preventive device does not move upward, in order to eliminate the above problem and improve the container transporting efficiency, and to provide a container group transfer mechanism which, even where an arrangement is employed to receive next containers by the time the forward-fall preventive device is closed, reduces the force of inertia acting on the forward-fall preventive device in a closing operation to decrease the impact of contact with the containers, thereby to check damage to the containers.

[Third Problem to be Solved by the Invention]

Conventionally, the forward-fall preventive device needs to behave in opening or closing time such that containers that tumble easily are transported by deliberately maintaining the contact with the pushing device as far as the airflow conveyer to avoid scattering during the transport, and that containers vulnerable to damage are transported in a rather loose state to check damage by minimizing the pressure of contact among the containers or by the pushing device. However, there is no method for controlling this. An apparatus or method having transport functions corresponding to such transport modes has not been developed.

A third object of the present invention, therefore, is to provide container transporting equipment and a container transporting method having transport functions corresponding to transport modes for controlling a pushing speed of the pushing device for pushing container groups out onto the airflow conveyer, in relation to a container transport speed of the airflow conveyer, thereby to solve the above problem.

DISCLOSURE OF THE INVENTION

[Means for Solving the First Problem]
[Construction]

In certain embodiments, the present invention, e.g., as illustrated in FIGS. 1 and 4 to 11, is characterized by a container group transfer mechanism comprising a pushing device 23 for horizontally pushing a container group 4 including a plurality of standing containers arranged and collected in a horizontal direction, by contacting said container group 4 at one side thereof and moving horizontally toward the other side, and a forward-fall preventive device 24 for contacting a forward end in a pushing direction of said container group 4 and switchable between a closed state for lying forwardly in the pushing direction of said container group 4, as said pushing device 23 moves horizontally, to be capable of preventing a forward fall of said containers, and an open state for opening a forward position in the pushing direction of said container group 4 to enable a discharge of the container group 4, wherein said forward-fall preventive device 24 is laterally switchable.

In other embodiments, the present invention. e.g. as shown in FIGS. 1 to 11, is characterized by container transporting equipment comprising a lift device 14 for vertically stacking in stages a plurality of container groups 4 each including a plurality of standing containers arranged and collected in a horizontal direction, and carrying and elevating, stage by stage, said plurality of container groups 4 stacked vertically, a conveyer 17 disposed adjacent said lift device 14 for receiving an uppermost container group elevated by said lift device 14 and transporting the container group horizontally, and a container group transfer mechanism having a pushing device 23 for pushing said uppermost container group 14 onto said conveyer 17 by contacting said container group 4 at one side thereof and moving horizontally toward the other side, and a forward-fall preventive device 24 switchable between a closed state for lying forwardly in a pushing direction of said container group 4, as said pushing device 23 moves horizontally, to be capable of preventing a forward fall of said containers, and an open state for opening a forward position in the pushing direction of said container group when said container group 4 rides said conveyer 17 to enable a discharge of said container group 4, wherein said forward-fall preventive device 24 is laterally switchable.

In other embodiments, such as illustrated in FIGS. 12 and 13, the present invention is characterized in that said conveyer 17 is an airflow conveyer 12.

Certain embodiments. e.g., as illustrated in FIGS. 1 and 4 to 11, are characterized by a container group transfer method comprising horizontally pushing, with a pushing device, a container group including a plurality of standing containers arranged and collected in a horizontal direction, by contacting said container group at one side thereof and moving horizontally toward the other side, and discharging the container group by opening a forward-fall preventive device for contacting a forward end in a pushing direction of said container group and switchable between a closed state for lying forwardly in the pushing direction of said container group, as said pushing device moves horizontally, to be capable of preventing a forward fall of said containers, and an open state for opening a forward position in the pushing direction of said container group to enable a discharge of the container group, in which said container group is discharged by laterally opening said forward-fall preventive device.

Other embodiments. e.g. such as illustrated in FIGS. 1 to 11, are characterized by a container group transporting method comprising vertically stacking in stages a plurality of container groups each including a plurality of standing containers arranged and collected in a horizontal direction, and carrying and elevating, stage by stage, with a lift device, said plurality of container groups stacked vertically, horizontally pushing, with a pushing device, an uppermost container group elevated by said lift device by contacting said container group at one side thereof and moving horizontally toward the other side to push said container group onto a conveyer disposed adjacent said lift device for receiving said uppermost container group and transporting the container group horizontally, and discharging said container group by opening a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said conveyer to enable a discharge of said container group, in which said container group is discharged by laterally opening said forward-fall preventive device.

The invention as illustrated in FIGS. 12 and 13, is characterized in that the conveyer is an airflow conveyer.

While reference numbers are set out as above for expediency of comparison to the drawings, such entry does not limit the present invention to the constructions shown in the accompanying drawings.

[Functions and Effects]

In certain embodiments said forward-fall preventive device is laterally openable and closable to allow an effective use of the forward and upper spaces of the container group transfer mechanism. The term laterally herein indicates a direction perpendicular to both the upstanding direction of the containers (front-to-back direction relative to the plane of FIGS. 10 and 11) and the pushing direction (direction of arrows in FIGS. 10 and 11). The term forward indicates forward in said pushing direction (direction of the arrow in FIG. 10). The term upper space indicates a space opposite from the conveyor.

Where, as in the prior art, the forward-fall preventive device is vertically openable and closable by pivotal movement of the arms pivotally supported by the props, it is necessary to secure a space for movement of the props occurring with the horizontal movement of the container group transfer mechanism, and a retraction space for allowing the forward-fall preventive device to retract forwardly and above the container group transfer mechanism when switched to the open state for discharging a container group. A tall container group in particular requires the forward-fall preventive device to be raised to a height for allowing said container group to be discharged, and a large space to be secured for the forward-fall preventive device to retract forwardly and above the container group transfer mechanism. However, where, as in the instant case, the forward-fall preventive device is laterally openable and closable, a retraction space is not required for the forward-fall preventive device to retract forwardly and above the container group transfer mechanism. Thus, the container group transfer mechanism may be disposed in a location having a limited upper space. It is also possible to accommodate, in a space forwardly of and above the container group transfer mechanism, for example, a monitoring instrument or a device of different function such as a container tumbling preventive mechanism.

As a result, the container group transfer mechanism of the present invention improves the degree of freedom of upper space designing, and can cope with a speedup and diversification of container transport. This mechanism may easily be introduced into existing container transporting equipment.

In some embodiments, the container transporting equipment has said forward-fall preventive device laterally switchable. It is therefore possible to accommodate a monitoring instrument or a container tumbling preventive mechanism in a space forwardly of and above the receiving portion.

That is, after the container group transfer mechanism pushes and transfers the uppermost container group elevated by the lift device, onto the receiving portion of the conveyor, the forward-fall preventive device may be switched to the open state to open a forward region in the pushing direction of the container group for discharging the container group. Since the forward-fall preventive device is opened laterally, a transport region is not required above the receiving portion for retracting the forward-fall preventive device. Thus, the container transporting equipment having the container group transfer mechanism may be installed in a location having a limited upward space. It is also possible to accommodate, in a space above said receiving portion, for example, a monitoring instrument or a device of different function such as a container tumbling preventive mechanism for monitoring presence of damage to or tumbling of the container group transferred to the receiving portion or for preventing tumbling in time of transfer.

As a result, the container transporting equipment has improved functionality to realize smooth transport.

According to certain embodiments of the invention, the conveyer adjacent said lift device need not employ a mechanical conveyer, but may use an airflow conveyer for transporting the containers by means of air. Thus the problems of the mechanical conveyer may be solved.

Conventionally, a mechanical conveyer is employed as the conveyer. The mechanical conveyer transports containers as placed on an endless rotating member, by frictional contact between the endless rotating member and container bottoms. Thus, there is a limitation to its transport speed for tumble-free transport. Fast transport is impossible.

For a feeding mechanism disposed in a downstream position for constricting a transport path to rearrange containers in container groups into a row to feed the cans without interruption to a next process, the lift device may elevate a plurality of container groups placed on a pallet, stage by stage, with the container group transfer mechanism transferring the container groups to the adjacent receiving portion of the conveyer. In such a construction, in order to cover a non-feed time after transferring a lowermost container on a pallet to the receiving portion until discharging the pallet and transferring an uppermost container on a next pallet to the receiving portion, a sufficient number of containers to be discharged from said feeding mechanism within said non-feed time must be stored on the conveyer or transport speed must be increased to prevent an interruption of the containers. However, the mechanical conveyer cannot increase its transport speed for transporting the containers, and the conveyer must have an increased length to store a sufficient number of containers for covering the non-feed time. Thus, the conveyer has to be very long.

With an increase in transport speed, the mechanical conveyer employing a transport mode relying on frictional contact would transmit the transporting force of the endless rotating member directly to a plurality of containers accumulating in said feed mechanism. An increased force of contact among the containers could result in damage or collapse.

On the other hand, in the construction of the present invention, a plate-like upper guide or the like may be provided as a tumble preventing mechanism to extend above and parallel to the conveyer from a space above the receiving portion to said feed mechanism for contacting the upper ends of the containers when the containers are about to tumble, thereby preventing tumbling. Thus, the airflow conveyer may be employed for transporting the containers by means of air. This airflow conveyer moves the containers on the conveyer by blowing air thereto. No frictional contact takes place between the endless rotating member and container bottoms occurring with the mechanical conveyer. Transport speed for transporting the container may be increased. Instead of covering said no-feed time with the number of containers, the containers may be supplied to the feed mechanism without interruption by increasing the transport speed of a next container group. Thus, the conveyer may have a reduced length.

In the air flow conveyer, even with increased speed of transport performed by means of air, a plurality of containers accumulating and contacting one another in said feed mechanism are free from the frictional contact between the endless rotating member in rotation and container bottoms occurring with the mechanical conveyer. With an escape of excess air, no undue force acts on the containers, and hence no chance of damage or collapse.

As a result, the container transporting equipment may be made compact to be installable in a small space. The containers may also have improved quality.

[Means for Solving the Second Problem]
[Construction]

As illustrated in FIG. 7, certain embodiments of the invention are characterized by a container group transfer mechanism comprising a pushing device 23 for horizontally pushing a container group 4 including a plurality of standing containers arranged and collected in a horizontal direction, by contacting said container group 4 at one side thereof and moving horizontally toward the other side, and a forward-fall preventive device 24 for lying forwardly in a pushing direction of said container group 4, as said pushing device 23 moves horizontally, to be capable of preventing a forward fall of said containers, and an open state for opening a forward position in the pushing direction of said container group to enable a discharge of the container group 4, wherein said forward-fall preventive device 24 includes turn elements 40 connected for pivotal movement about rotary shafts 39, rotary drive mechanisms 38 for swinging said turn elements 40 within a predetermined angular range, and gate members 41 fixedly supported by said turn elements for contacting a forward end in a pushing direction of said container group 4 to be capable of preventing a forward fall of the containers, said turn elements 40 being formed to have centers of gravity located closer to said rotary shafts 38 than centers of gravity of said gate members 41.

In certain embodiments, such as illustrated in FIG. 9, the forward-fall preventive device includes buffer mechanisms 45 for absorbing inertial swinging of said gate members 41.

In the embodiment illustrated in FIG. 9, the rotary drive mechanisms 38 are formed of air cylinders 42.

As illustrated in FIG. 8, certain embodiments of the invention are characterized in that said gate members 41 have elastic materials 59 provided in positions contactable with the forward end in the pushing direction of said container group 4.

While reference numbers are set out as above for expediency of comparison to the drawings, such entry does not limit the present invention to the constructions shown in the accompanying drawings.

[Functions and Effects]

Certain embodiments of the invention are capable of reducing the force of inertia acting on the turn elements and gate members during a closing operation.

That is, the force of inertia acting on the turn elements and gate members results from a centrifugal force generated about the rotary shafts acting as support shafts. Thus, the farther away from the rotary shafts, the greater the force of inertia becomes.

Where, as shown in FIG. 21, one end of each turn element 40 extends to a substantially middle position in the right and left direction of the container group transfer mechanism 2 and fixedly supports the gate member 41 substantially equal in length to said turn element 40, the centers of gravity of the turn elements 40 and the centers of gravity of the gate members 41 are located in approximately the same position. In the present invention, the turn elements are formed to have centers of gravity located closer to the rotary shafts than centers of gravity of said gate members. The overall center of gravity of the turn elements and gate members regarded as integral is closer to said rotary shafts than in the typical construction shown in FIG. 21. This produces the effect of reducing the force of inertia acting on the turn elements and gate members during a closing operation.

As a result, the impact of the gate members contacting the containers may be reduced to check damage to the containers.

According to certain embodiments of the present invention the impact of the gate members contacting the containers may be further reduced.

That is, the buffer mechanisms can absorb the force of inertia acting on the turn elements and gate members swinging by inertia. This decreases the impact of the gate members contacting the containers.

As a result, damage to the containers may be further checked.

In certain embodiments, inexpensive air cylinders may be used.

That is, an air cylinder is incapable of fine controls such as stopping rotation at a set position as is possible with a servomotor. Where air cylinders used as the rotary drive mechanisms, it is impossible to perform fine controls such as stopping the turn elements and gate members in home position when the forward-fall preventive device is closed. The turn elements and gate member could swing to excess to contact the containers with impact, thereby damaging the containers. Normally, use of the air cylinders is inappropriate. By forming the turn elements have centers of gravity located closer to the rotary shafts than the centers of gravity of the gate members, or providing the buffer mechanisms for absorbing inertial swinging of the gate members as the force of inertia acting on the turn elements and gate members may be decreased or absorbed. It is therefore possible to use air cylinders as the rotary drive mechanisms.

As a result, the rotary drive mechansim can employ inexpensive air cylinders, compared with expensive rotary drive mechanisms in the form of servomotors or the like. This realizes a reduction in the cost of the apparatus.

According to certain embodiments, the impact of contact with the containers may be absorbed.

That is, where, for example, the gate members are formed of a rigid material such as metal, even though the impact of the gate members contacting the containers is decreased, the rigid metallic gate members transmit the impact as it is to the containers, which could damage the containers. Where, as in the present invention, the gate members have elastic materials provided in positions contactable with the forward end in the pushing direction of the container group, the impact occurring upon contact with the containers may be absorbed by an elastic deformation of the elastic materials.

As a result, damage to the containers may be further checked.

[Means for Solving the Third Problem]
[Construction]

The invention, as illustrated in FIG. 4, is characterized by container transporting equipment comprising a device for vertically stacking in stages a plurality of container groups each including a plurality of standing containers arranged and collected in a horizontal direction, and carrying and elevating, stage by stage, said plurality of container groups stacked vertically, an air conveyer 12 disposed adjacent said lift device for receiving an uppermost container group elevated by said lift device and transporting the container group horizontally, a pushing device 23 for pushing said uppermost container group onto said airflow conveyer 12 by contacting said container group at one side thereof and moving horizontally toward the other side, and a forward-fall preventive device 24 switchable between a closed state for lying forwardly in a pushing direction of said container group 4, as said pushing device 23 moves horizontally, to be capable of preventing a forward fall of said containers, and an open state for opening a forward position in the pushing direction of said container group when said container group rides said airflow conveyer 12 to enable a discharge of said container group, wherein said container transporting equipment comprises a speed varying mechanism 62 for varying a relative speed between a transport speed of said airflow conveyer 12 and a pushing speed of said pushing device.

The invention, as illustrated in FIG. 14, is characterized by comprising a control device 66 for automatically varying the transport speed of said airflow conveyer 12 and the pushing speed of said pushing device 23.

Certain embodiments of the invention are characterized in that the pushing speed of said pushing device is set faster than the transport speed of said airflow conveyer.

In certain embodiments, the present invention is characterized in that, as said pushing device moves horizontally forward in the pushing direction on said airflow conveyer, said forward-fall preventive device is switched to the open state, and the transport speed of said airflow conveyer is increased the further forward in the direction of transporting the containers.

As illustrated in FIG. 15, certain embodiments of the present invention are characterized by container transporting equipment comprising a lift device for vertically stacking in stages a plurality of container groups 4 each including a plurality of standing containers 3 arranged and collected in a horizontal direction, and carrying and elevating, stage by stage, said plurality of container groups 4 stacked vertically, an air conveyer 12 disposed adjacent said lift device for receiving an uppermost container group elevated by said lift device and transporting the container group horizontally, a pushing device 23 for pushing said uppermost container group 4 onto said airflow conveyer 12 by contacting said container group 4 at one side thereof and moving horizontally toward the other side, and a forward-fall preventive device 24 switchable between a closed state for lying forwardly in a pushing direction of said container group 4, as said pushing device 23 moves horizontally, to be capable of preventing a forward fall of said containers, and an open state for opening a forward position in the pushing direction of said container group when said container group 4 rides said airflow conveyer 12 to enable a discharge of said container group, wherein said container transporting equipment comprises detecting sensors 67 for detecting presence of containers in regions where an opening operation of said forward-fall preventive device 24 takes place, and a control device 68 for maintaining said forward-fall preventive device 24 in the closed state when said detecting sensors 67 detect the containers present in the regions of opening, even if said container group 4 is brought by said pushing device 23 onto said airflow conveyer 12, and for switching said forward-fall preventive device 24 to the open state for discharging said container group 4 when an absence of containers is detected.

Certain embodiments of the present invention are characterized by comprising an upper guide disposed above said airflow conveyer for contacting upper ends of the containers to prevent tumbling of the containers being transported, said forward-fall preventive device being switched in the open state when the horizontal movement of said pushing device 23 brings at least the containers forward in the pushing direction of said container group reach a position under said upper guide.

Some embodiments are characterized by a container group transporting method comprising providing a lift device for vertically stacking in stages a plurality of container groups each including a plurality of standing containers arranged and collected in a horizontal direction, and carrying and elevating, stage by stage, said plurality of container groups stacked vertically, horizontally pushing, with a pushing device, an uppermost container group elevated by said lift device by contacting said container group at one side thereof and moving horizontally toward the other side to push said container group onto an airflow conveyer disposed adjacent said lift device for receiving said uppermost container group and transporting the container group horizontally, and discharging said container group by opening a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said airflow conveyer to enable a discharge of said container group for transport by said airflow conveyer, characterized in that said container group is discharged by freely varying a relative speed between a transport speed of said airflow conveyer and a pushing speed of said pushing device.

While reference numbers are set out as above for expediency of comparison to the drawings, such entry does not limit the present invention to the constructions shown in the accompanying drawings.

[Functions and Effects]

Certain embodiments of the invention are capable of varying the transport functions.

That is, in a discharging step, a container group is discharged from the lift device onto the adjacent airflow conveyer. After discharging the container group onto the airflow conveyer, the pushing device is moved back onto the lift device to receive a next container group, and receives an uppermost container group elevated by the lift device. The pushing device is moved horizontally onto the adjacent airflow conveyer. The forward-fall preventive device is switched to the open state. The above step is repeated. A non-feed time not feeding any containers occur until the next container group is discharged onto the airflow conveyer. Because of the non-feed time, an interruption could occur with the containers transported through the single-row transport path.

This non-feed time is further extended in an operation in which, after discharging a lowermost container on a pallet onto the airflow conveyer, an uppermost container on a next pallet is discharged onto the airflow conveyer.

In order to avoid the interruption occurring with the containers transported through the single-row transport path, a sufficient number of containers to be transported through the single-row transport path within said non-feed time must be stored on the airflow conveyer or container transport speed must be increased to prevent an interruption of the containers transported through the single-row transport path.

Then, the present invention provides a speed varying mechanism for varying a relative speed between the transport speed of the airflow conveyer and the pushing speed of the pushing device. As a transporting method for avoiding an interruption of the containers transported through the single-row transport path, apart from a method for transporting a container group in which the airflow conveyer and pushing device are movable at the same speed, a method may be employed for transporting the containers in which the pushing speed of the pushing device is faster than the transport speed of the airflow conveyer.

Where, for example, containers such as short cans are transported with no upper guide disposed above the airflow conveyer, the transport speed of the airflow conveyer may be slowed in order to check tumbling of the containers on the airflow conveyer. Even so, by adjusting the speed of feeding container groups by the pushing device, a sufficient number of containers may be secured on the airflow conveyer to avoid an interruption of the containers transported through the single-row transport path.

Further, a method may be employed for transporting the containers in which the transport speed of the airflow conveyer is faster than the pushing speed of the pushing device.

Where, for example, containers such as long cans (or short cans) are transported with an upper guide disposed above the airflow conveyor, the pushing speed of the pushing device may be slowed in order to discharge the containers onto the airflow conveyor reliably without tumbling. Even so, since the upper guide prevents tumbling of the containers, the transport speed of the airflow conveyor may be adjusted to avoid an interruption of the containers transported through the single-row transport path.

In addition, by employing the method for transporting the containers in which the transport speed of the airflow conveyer is faster than the pushing speed of the pushing device, the containers may be transported in a rather loose state to reduce a contact pressure among the containers or by the pushing device. Damage to containers particularly vulnerable to damage may be checked.

As a result, the container transporting equipment and the container transporting method provided are capable of varying transport speed according to varied shapes the containers and equipment.

According to certain embodiments of the present invention, the transport speed of the airflow conveyer and the pushing speed of the pushing device may be varied automatically.

A control device is provided for varying the transport speed of the airflow conveyer and the pushing speed of the pushing device. For example, by providing sensors for detecting presence or a mounting position of the upper guide and for recognizing shapes such as sizes, intervals between, and tumbling of the containers transported, information may be transmitted to the control device for automatically varying the transport speed of the airflow conveyer and the pushing speed of the pushing device to a proper relative speed. Sensors may be provided for detecting a state of the containers transported. Based on information transmitted from these sensors to the control device, the transport speed of the airflow conveyer and the pushing speed of the pushing device may be varied automatically to a proper relative speed.

As a result, the container transporting equipment provided is capable of automatically varying container transport speed in accordance with varied shapes of containers, installation, and transport conditions.

In certain embodiments, when the container group is discharged onto the airflow conveyer by opening the forward-fall preventive device during a horizontal movement forwardly in the pushing direction of the pushing device, the containers may be discharged onto the airflow conveyer while being in contact with one another.

In order to shorten the container discharging time, for example, it is conceivable to discharge the containers onto the airflow conveyer by opening the forward-fall preventive device during a horizontal movement forwardly in the pushing direction of the pushing device. However, a level difference often occurs between the lift device and airflow conveyer when the container group is discharged from the lift device onto the airflow conveyer (the lift side being higher for the containers not to be caught when discharged). By contacting preceding containers, the succeeding containers are less likely to tumble forward. Where, for example, the transport speed of the airflow conveyer is set faster than the pushing speed of the pushing device, the container group may be discharged onto the airflow conveyer by opening the forward-fall preventive device during a horizontal movement forwardly in the pushing direction of the pushing device. Then, when the containers at the forward end of the container group in the pushing device ride the airflow conveyer, those containers are transported fast by the airflow conveyer. This results in gaps formed with succeeding containers, hence a problem of the containers falling forward with ease.

However, in the present invention, the pushing speed of the pushing device is set faster than the transporting speed of the airflow conveyer. The containers at the forward end of the container group in the pushing device are never transported fast by the airflow conveyer even when the forward-fall preventive device is opened during a horizontal movement forwardly in the pushing direction of the pushing device. The containers may be discharged onto the airflow conveyer while being in contact with one another.

As a result, the container transporting equipment provided is capable of checking a forward fall of the containers when the container group is discharged from the lift device onto the airflow conveyer.

In preferred embodiments of the present invention, the containers may be discharged from the lift device onto the airflow conveyer steadily and in a reduced time, and the containers discharged may be transported at high speed.

Since forward-fall preventive device is switched to the open state as the pushing device moves horizontally and forwardly in the pushing direction on the airflow conveyer, the time spent to put the forward-fall preventive device in the open state may be included in the horizontal moving time of the pushing device. This realizes a reduction in the container discharging time compared with the case of discharging the containers onto the airflow conveyer after ending the horizontal movement of the pushing device onto the airflow conveyer.

When, for example, the containers are abruptly discharged to a position of fast transport, the containers tumble easily owing to a difference in relative speed. Where, as in the present invention, the transport speed of the airflow conveyer is the faster the farther forward in the transporting direction, the containers may be discharged a position of moderate transport speed of the airflow conveyer, and the containers received may be transported at gradually increased speed. Thus, the containers may be discharged and transported steadily with little chance of tumbling of the containers.

As a result, the container transporting equipment provided is capable of improving the container transport performance.

In certain embodiments, the present invention is capable of preventing tumbling of the containers discharged earlier.

That is, discharging onto the airflow conveyer of container groups by the pushing device is performed in a discharging step repeated at fixed intervals to discharge the container group by opening the forward-fall preventive device when the container group in the pushing device rides the airflow conveyer as the pushing device moves forward in the pushing direction. When, for example, containers discharged at a preceding discharging step remain in regions of opening of the forward-fall preventive device under some circumstances (e.g. crowding and the like of the containers transported), the containers present in the regions of opening of the forward-fall preventive device would be knocked down by the forward-fall preventive device opened in an opening operation. Further, there is a possibility of the tumbling of these containers knocking down adjacent containers one after another in chain action, thereby posing a problem.

However, in the present invention, detecting sensors are provided for detecting the presence of the containers in the regions of opening of the forward-fall preventive device. When the detecting sensors detect the presence of the container in the opening regions, the forward-fall preventive device is maintained in the close state, thereby to avoid the containers being knocked down by the forward-fall preventive device in the opening operation. When an absence of containers from the opening regions is detected, the forward-fall preventive device is opened and switched to the open state for discharging the container group to execute a normal step of discharging the container group.

As a result, the container transporting equipment provided is capable of improving the container transport performance.

According to certain embodiments of the present invention the containers may be discharged onto the airflow conveyer without tumbling.

With the upper guide provided for preventing the containers tumbling during transport by contacting the upper ends of the containers, where, for example, the container group is discharged by switching the forward-fall preventive device to the open state before reaching a position under the upper guide, the containers could tumble before reaching the position under the upper guide. In the present invention, the container group is discharged by switching the forward-fall preventive device to the open state upon reaching the position under the upper guide. Thus, the containers may be discharged onto the airflow conveyer without tumbling.

As a result, the container transporting equipment provided is capable of improving the container transport performance.

BRIEF DESCRIPTION OF THE DRAWINGS

FIG. 16 is an explanatory functional view of this application;

FIG. 22 is a view showing a modified example of pushing device.

BEST MODE FOR CARRYING OUT THE INVENTION

Container transporting equipment 1 in one embodiment of the present invention will be described hereinafter with reference to the drawings.

Figure 1:
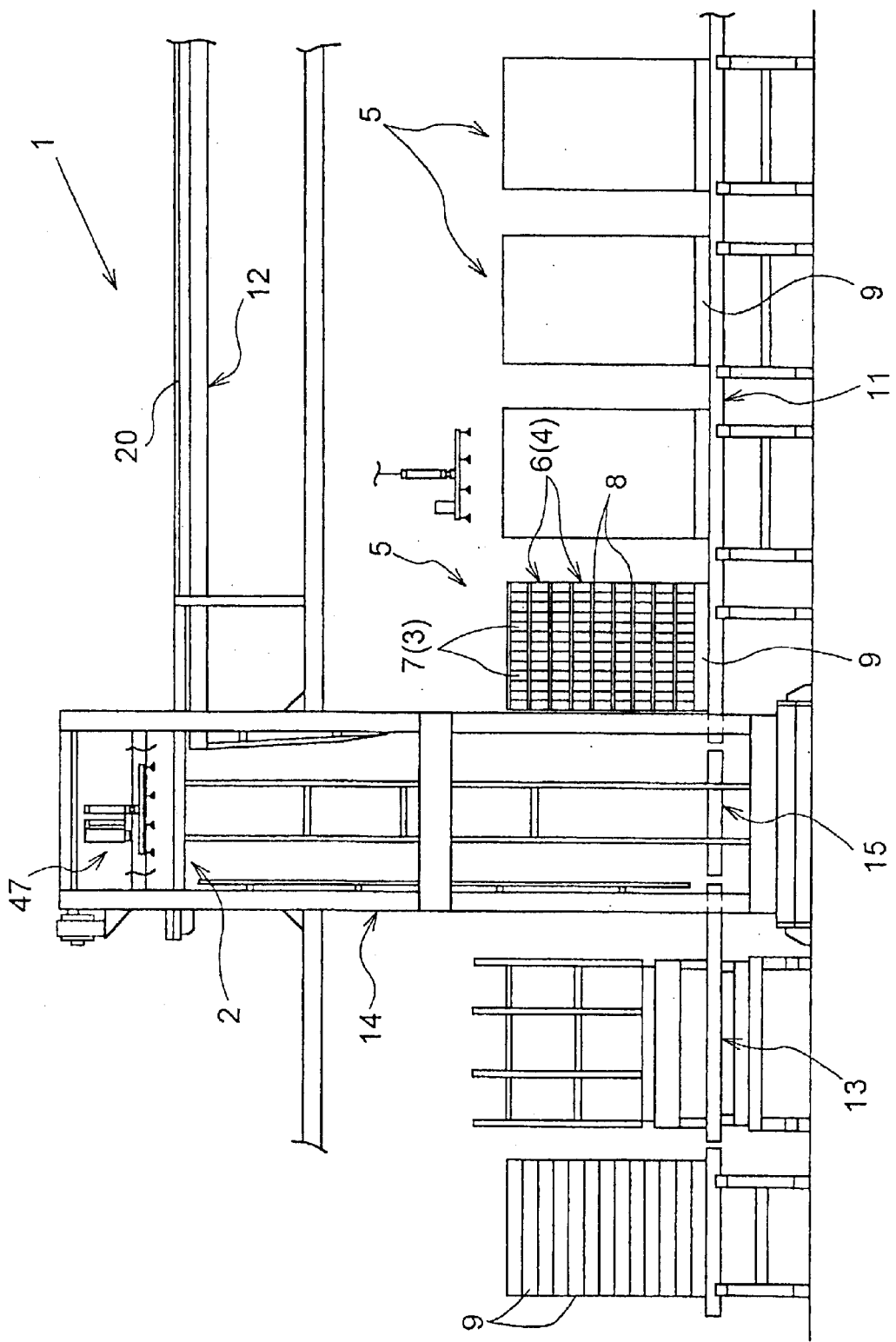
FIG. 1 is a side elevation of transporting equipment in one embodiment of the present invention.

As shown in FIG. 1, the container transporting equipment 1 includes a transport conveyer 11 for transporting can group stacks 5 each including a plurality of can groups 6 (one example of container groups 4) vertically stacked on a pallet 9, with separate sheets 8 interposed in between, each can group having a plurality of beer or soft drink cans 7 (one example of containers 3) radially arranged and collected in upstanding posture; a lift device 14 for elevating, stage by stage, each can group stack 5 transported by the transport conveyer 11; an airflow conveyer 12 (one example of conveyer 17) disposed adjacent the lift device 14 for receiving an uppermost one of the can groups 6 elevated by the lift device 14 and horizontally transporting the can group to a next process; a container group transfer mechanism 2 (see FIG. 4) having a pushing device 23 for contacting one side of the uppermost can group 6 elevated by the lift device 14 and horizontally moving toward the other side to push the can group 6 out onto the adjacent airflow conveyer 12, and a forward-fall preventive device 24 switchable between a closed state for lying forwardly in a pushing direction of the can group 6, as the pushing device 23 moves horizontally, to be capable of preventing a forward fall of cans 7, and an open state for opening a forward position in the pushing direction of the can group 6 when the can group 6 rides the airflow conveyer 12 to enable a discharge of the can group 6; and a pallet discharge conveyer 13 for discharging pallets 9 no longer needed after discharging all can groups 6.

Figure 2:
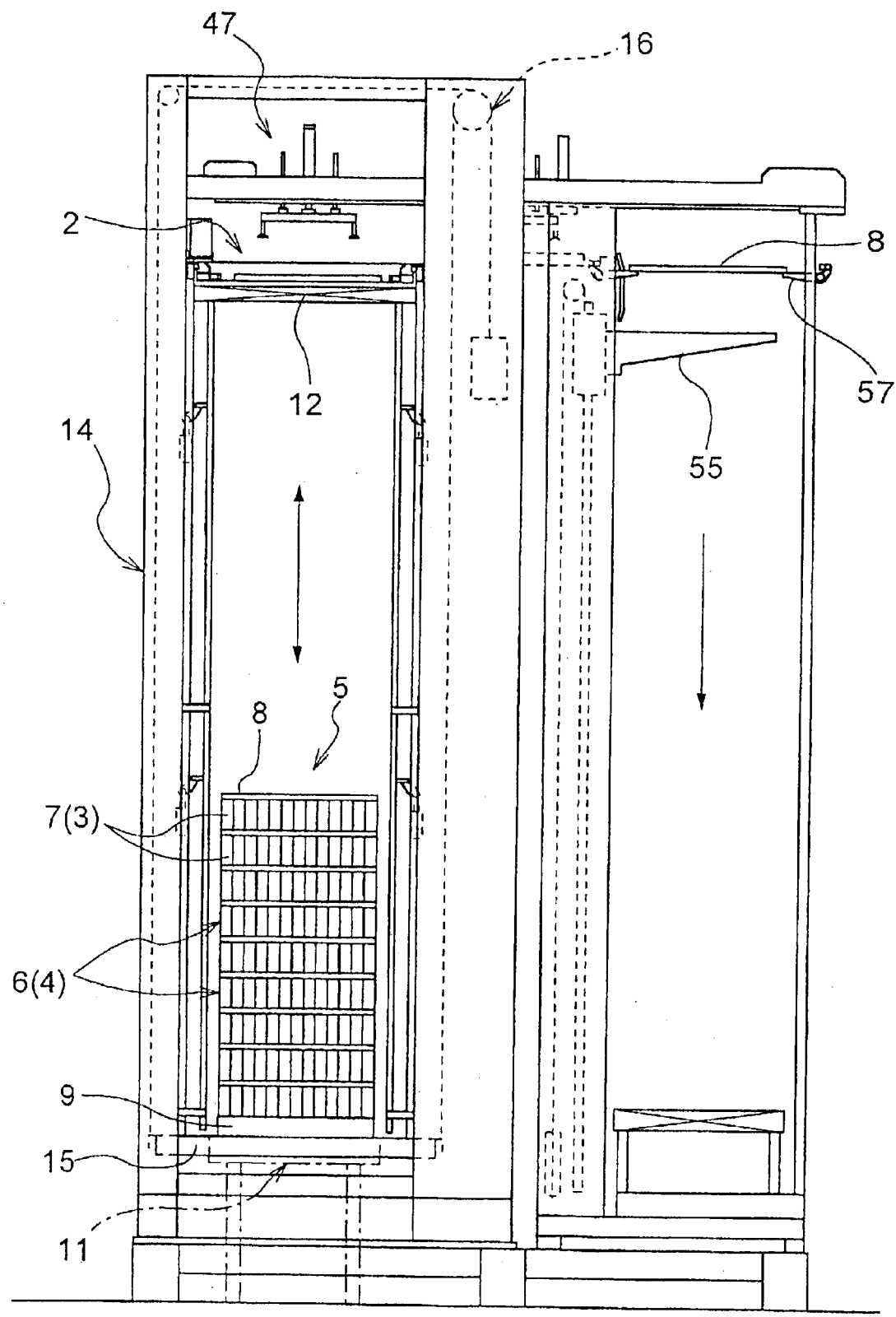
FIG. 2 is a front view of a lift device according to the present invention.

As shown in FIG. 2, said lift device 14 includes a lift deck 15 for supporting each can group stack 5 transported by the transport conveyer 11, and a lift deck moving mechanism 16 for vertically moving the lift deck 15 such as by AC servomotor drive, for example, through gear engagement. In time of upward movement, the lift deck 15 is driven to elevate the can group stack 5 placed thereon, by degrees, one can group 6 after another. The pallet 9 no longer needed after discharging all can groups 6 is lowered and the pallet 9 is transferred to the pallet discharge conveyer 13 by a pallet transfer device not shown.

As shown in FIG. 16, a single row transport path is disposed at a rear, downstream end of said airflow conveyer, in the form of a funnel with tapering side wall plates of the transport path to feed one can after another to the next process.

Figure 12:
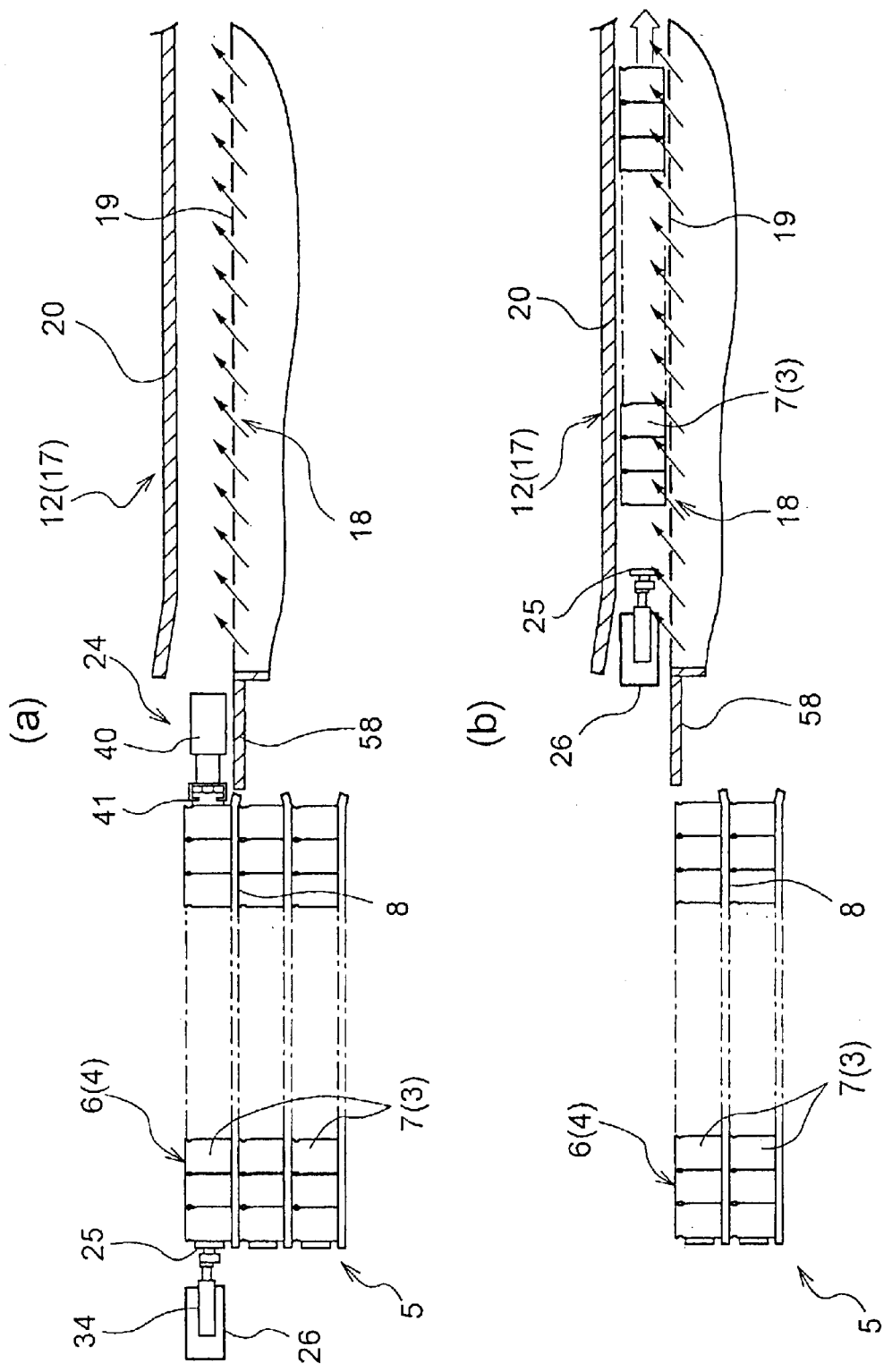
FIG. 12 is an explanatory functional side view showing the container group transfer mechanism according to the present invention.
Figure 13:
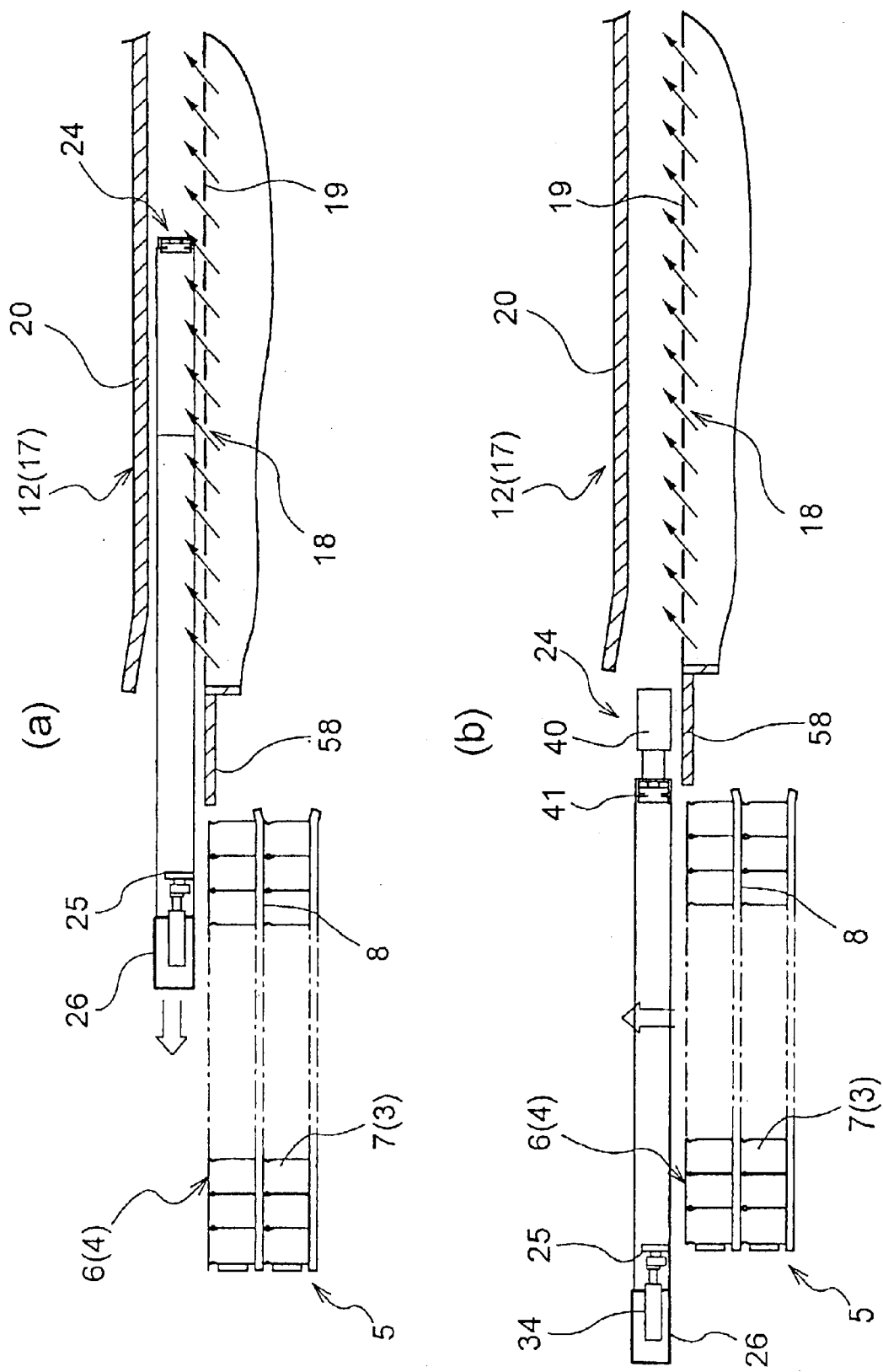
FIG. 13 is an explanatory functional side view showing the container group transfer mechanism according to the present invention.

As shown in FIGS. 12 and 13, this airflow conveyer 12 includes a deck plate 19 defining a plurality of air blowout bores 18, and a plate-like upper guide 20 disposed above and parallel to the deck plate 19, in a position 3 mm to 5 mm above the height of the cans. The cans 7 are transported downstream in a somewhat floating fashion with air blown against the bottoms of cans 7 placed on the deck plate 19. Even when the cans start tumbling at this time, the tops thereof will contact the upper guide 20, whereby the cans 7 are prevented from tumbling. This is due to no clearance being allowed between the cans 7 and upper guide 20.

Figure 5:
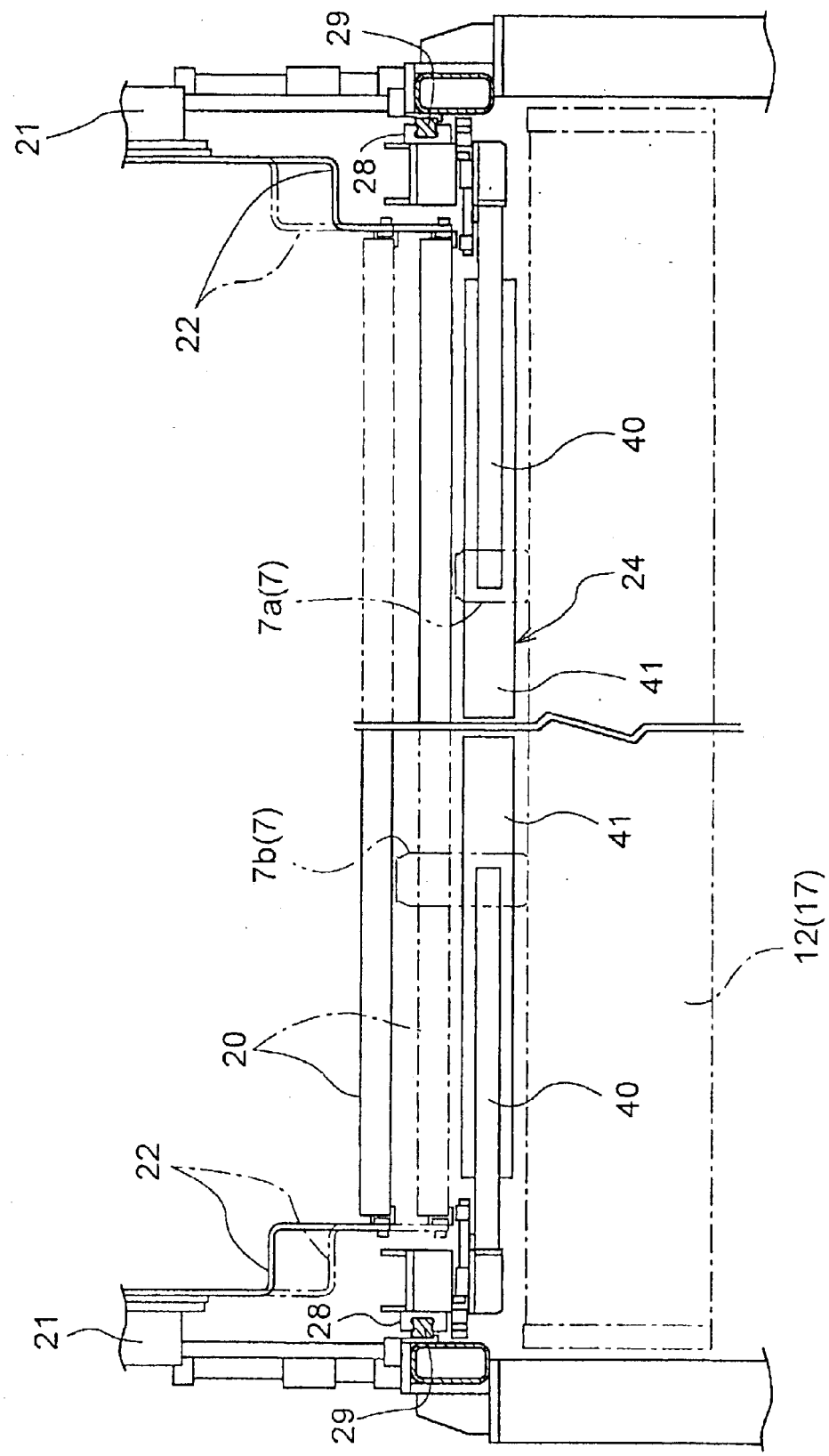
FIG. 5 is an explanatory functional view showing a mounting state of an upper guide according to the present invention.

As shown in FIG. 5, said upper guide 20 is supported by and fixed at side walls thereof to opposite side walls of the airflow conveyer 12 by air cylinders, not shown, erected in a plurality of locations along the transport direction. The guide is switchable to a height matched to the cans 7 transported (long cans or short cans) in a one-touch operation of a push-button switch to operate the air cylinders.

As shown in the right side of FIG. 5, for example, when transporting low-height cans 7a (short cans), the push-button switch is pressed to operate the air cylinders in a one-touch operation to switch the upper guide 20 to a low set position to prevent tumbling of the low cans 7a.

As shown in the left side of FIG. 5, when transporting high cans 7a (long cans), the push-button switch is pressed to operate the air cylinders in a one-touch operation to switch the upper guide 20 to a high set position to prevent tumbling of the high cans 7a.

Figure 4:
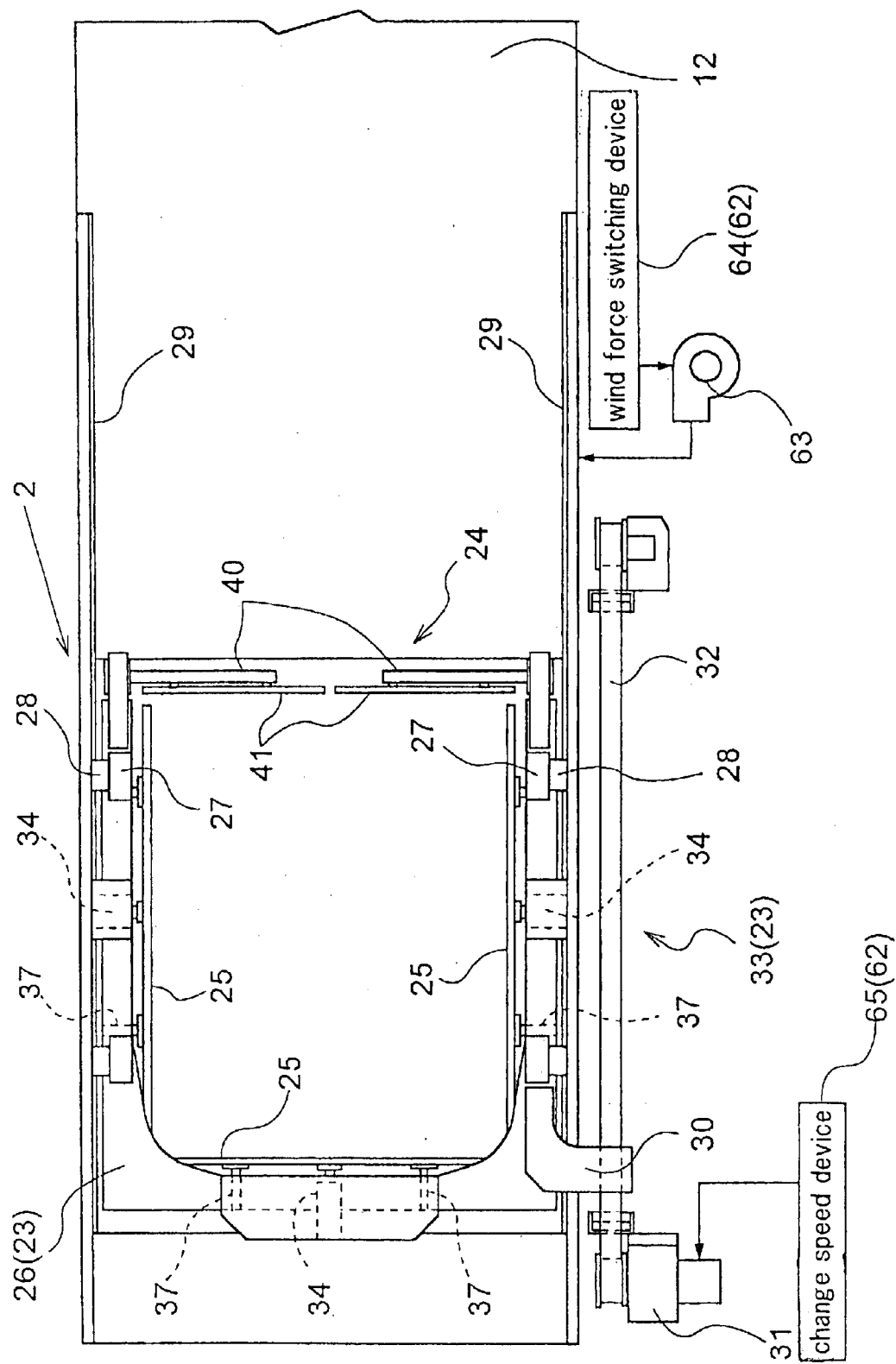
FIG. 4 is a schematic plan view showing a principal portion of the container transporting equipment according to the present invention.
Figure 6:
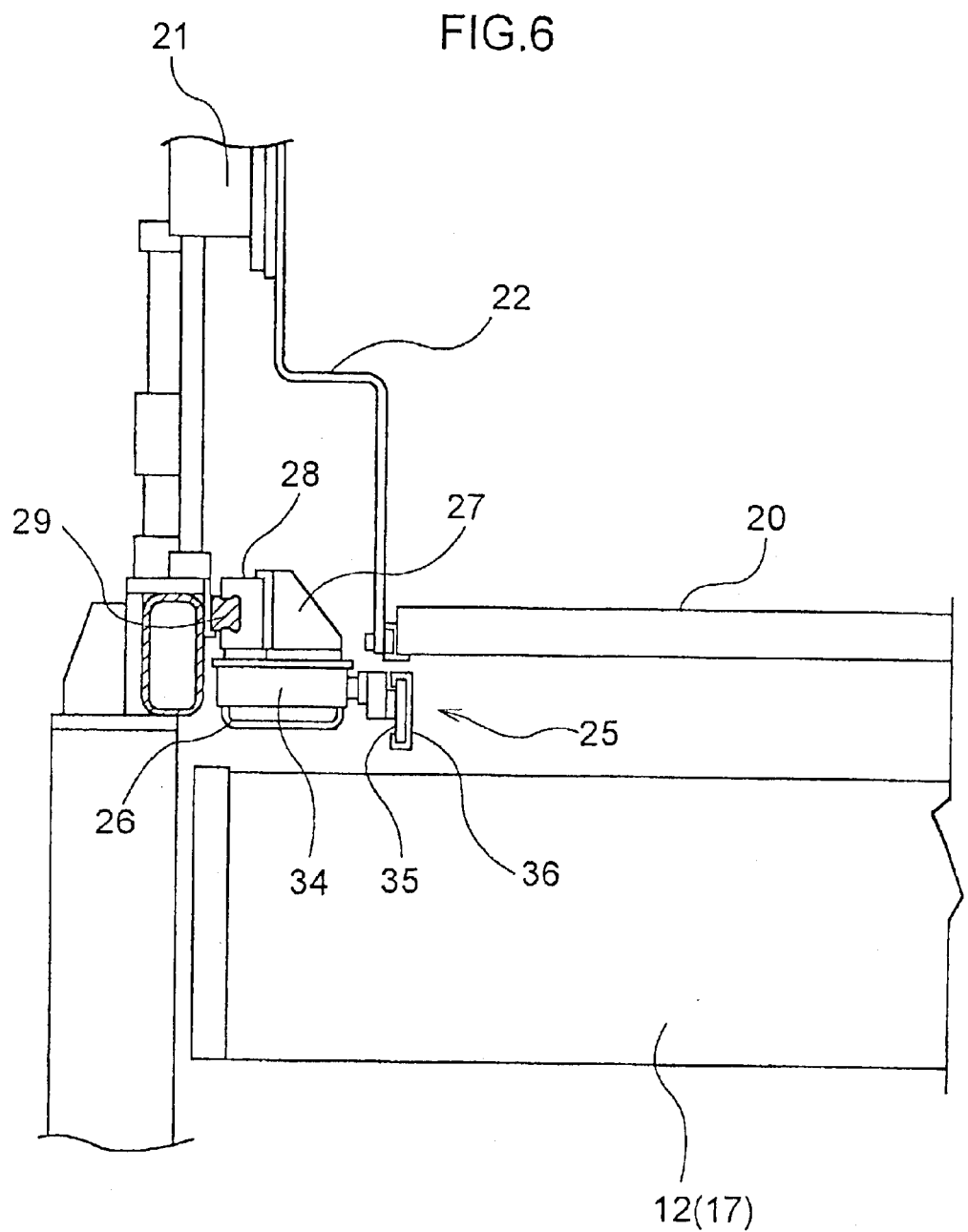
FIG. 6 is an enlarged fragmentary view showing a mounting device according to the present invention.

As shown in FIGS. 4 and 6, said pushing device 23 includes a frame 26 U-shaped in plan view and having three hold bars 25 arranged in three inner positions and protrudable and retractable by air cylinders 34, and a frame moving mechanism 33 having engaging members 28 attached to a plurality of brackets 27 fixed below the frame 26 and engaged, supported and guided by guide rails 29 attached to frame supporting side walls, and an arm extending laterally outward from an upper position of the frame 26 and gripping a belt 32 driven by a servomotor 31, thereby horizontally moving the frame 26 forward and backward with forward and backward movement of the belt 32 in the pushing direction of the can group 6.

As shown in FIG. 6, each said hold bars 25 has a bar member 36 formed of a resin and fitted on a plate 35 attached to cylinder rods of the air cylinders 34. The cans 7 have a reduced chance of being damaged when contacting the bar members 36.

Numeral 37 in FIG. 4 denotes slide shafts arranged at the right and left sides of air cylinders 34 for guiding the hold bars 25 in the protrusion and retraction by the air cylinders 34 without causing complication.

Figure 7:
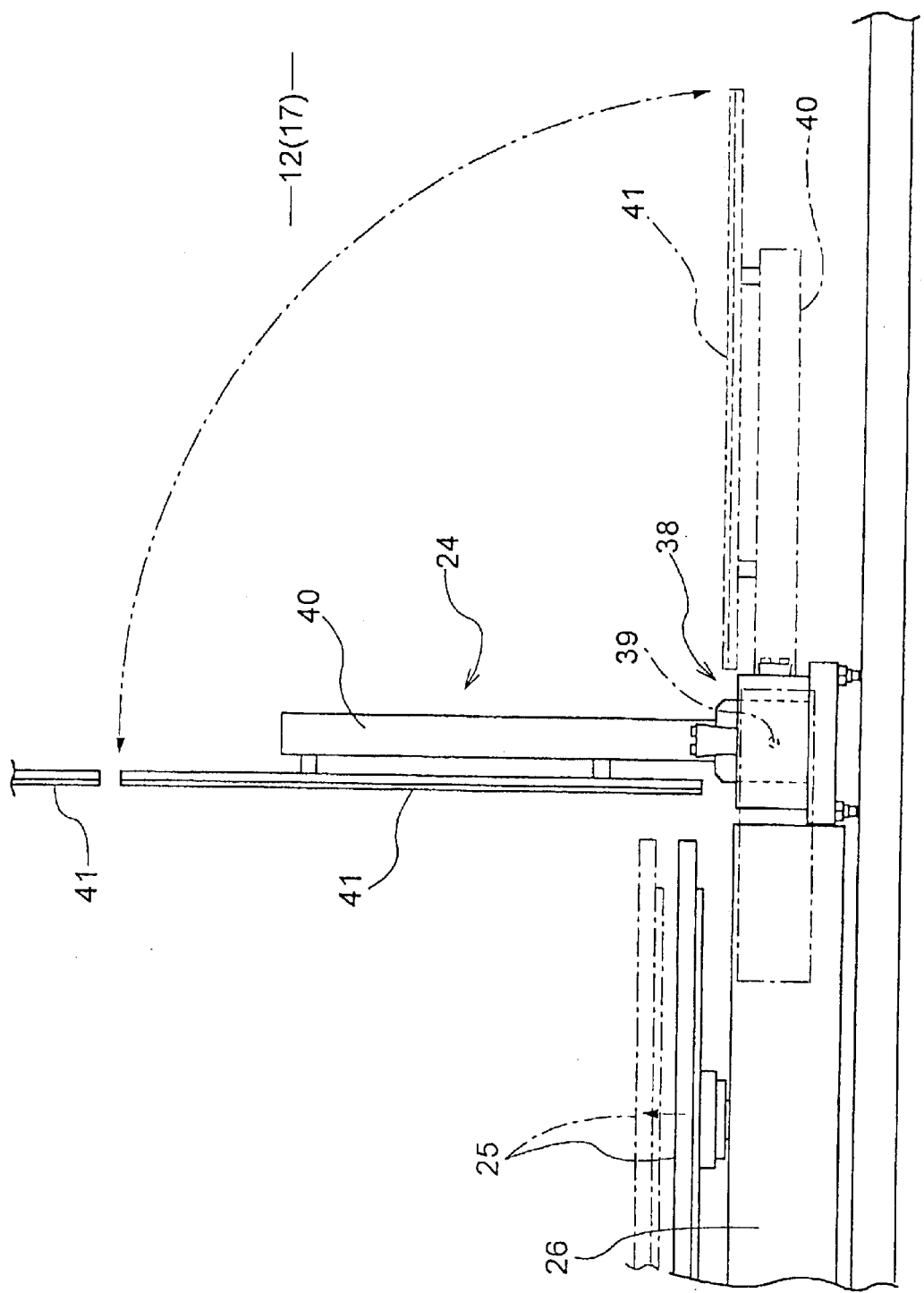
FIG. 7 is an enlarged fragmentary explanatory functional view showing a forward-fall preventive device according to the present invention.

As shown in FIG. 7, said forward-fall preventive device 24 includes a pair of rotary drive mechanisms 38 for swing driving within a predetermined angular range, a turn element 40 pivotally connected to a rotary shaft 39 of each rotary drive mechansim 38, and a gate member 41 fixedly supported by the rotating member for contacting a forward end in the pushing direction of the can group 6 to prevent a forward fall of the cans 7. The gate members 41 are driven by the rotary drive mechanisms 38 to swing open and close in double-door fashion.

At this time, the turn elements 40 have a short extending length to have the centers of gravity located closer to the rotary shafts than the centers of gravity of the gate members. This reduces the force of inertia acting on the turn elements and gate members in a closing operation, to decrease the impact of the gate members 41 contacting the cans 7 and check damage to the cans 7.

Figure 8:
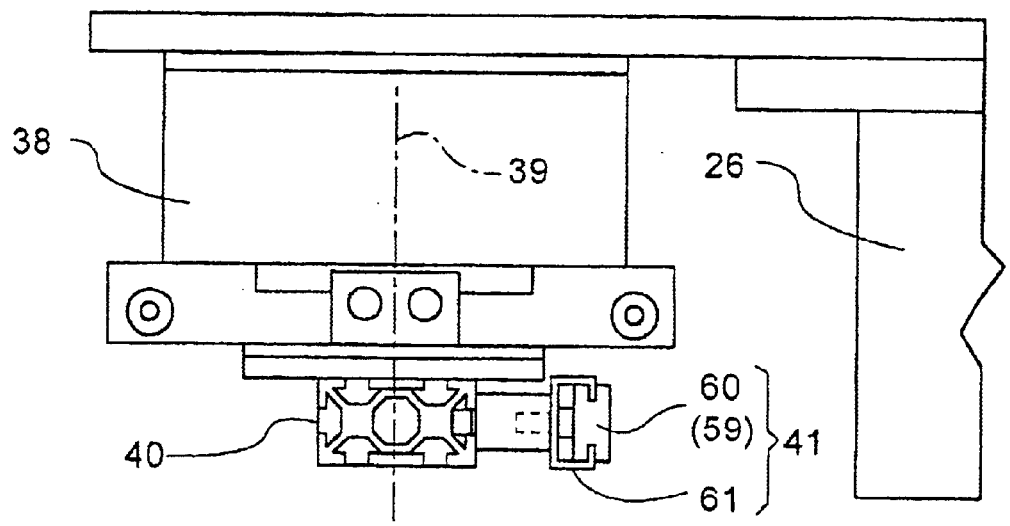
FIG. 8 is an enlarged fragmentary explanatory view showing a rotary drive mechansim according to the present invention.

As shown in FIG. 8, said gate member 41 has a gate bar 60 formed of polyethylene resin (one example of elastic material 59) and engaged and supported by a channel-shaped mount 61 attached to the turn element 40, in a position of the gate member 41 contacting the forward end in the pushing direction of can group 6. With this, the impact occurring in time of contact with the can group 6 may be absorbed by elastic deformation of the polyethylene resin to check damage to the cans 7.

The gate member 41 undergoes severe damage or wear in positions contacting can groups 6. The gate bar 60 engaged and supported by the mount 61 may only be released and replaced with a new gate bar 60. This provides for improved economy and efficiency of changing operation.

Figure 9:
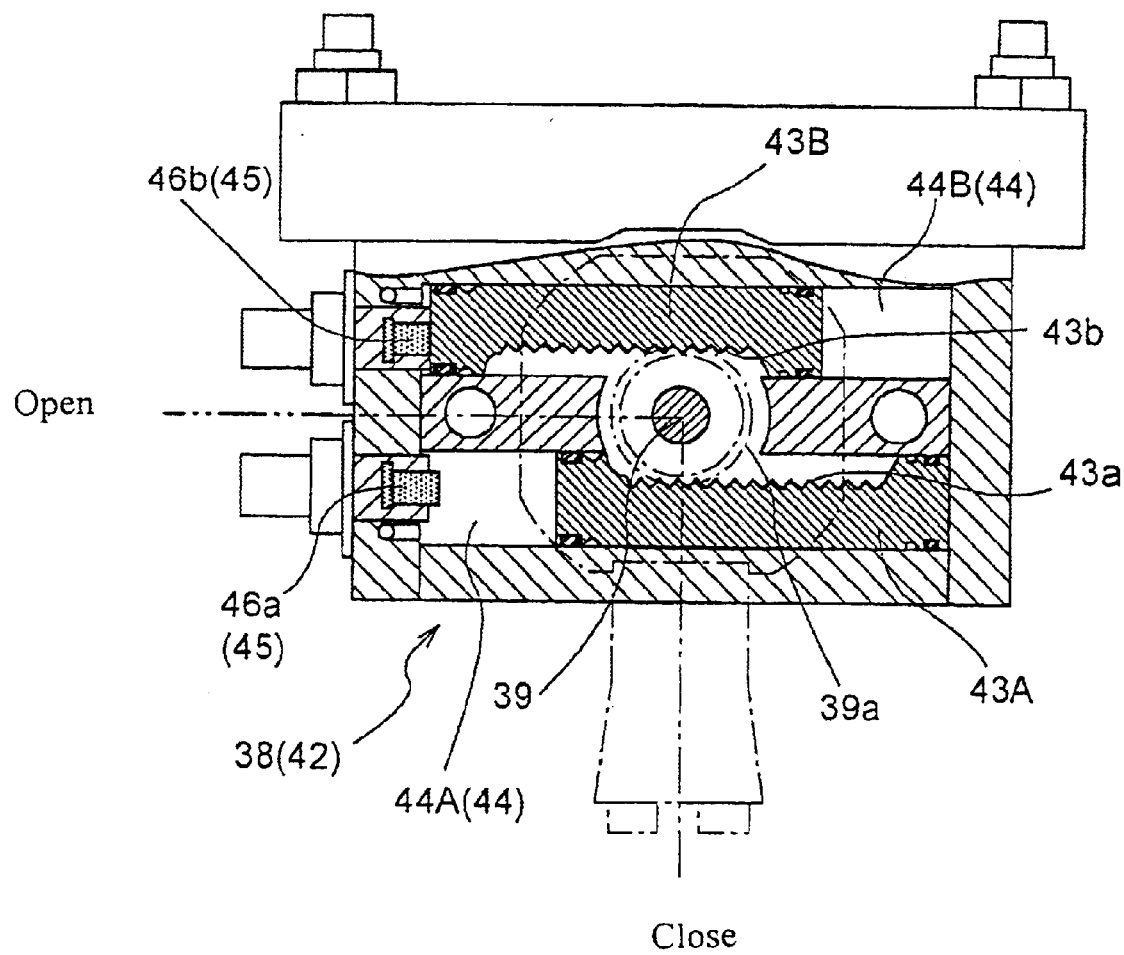
FIG. 9 is an explanatory view, partly in section, showing the rotary drive mechansim according to the present invention.

As shown in FIG. 9, said rotary drive mechansim 38 comprises air cylinders 42 with a pinion gear 39a mounted on the rotary shaft 39, racks 43a and 43b formed on right and left pistons 43A and 43B, respectively, and engaged with the pinion gear 39a. Air is supplied into and exhausted from cylinders 44 to move the pistons 43A and 43B.

The movement of the pistons 43A and 43B rotates the rotary shaft 39 to open and close the turn element 40 and gate member 41 pivotally connected to the rotary shaft 39.

At this time, cushion rubber elements 46a and 46b (one example of buffer mechanism 45) are disposed at end surfaces in the respective cylinders 44A and 44B. In time of an opening operation to the open state to open a forward position in the pushing direction of can group 6 for discharging the can group 6, an end surface of the piston 43A contacts the cushion rubber 46a. An elastic deformation of cushion rubber 46a absorbs the force of inertia occurring with the opening operation to act on the turn element 40 and gate member 41. In time of a closing operation to the closed state for preventing a forward-fall of the can group 6, an end surface of piston 43B contacts the cushion rubber 46b. An elastic deformation of cushion rubber 46b absorbs the force of inertia occurring with the closing operation to act on the turn element 40 and gate member 41. This decreases the impact of the gate member 41 contacting the cans 7 to check damage to the cans 7. (see FIG. 9)

Next, basic steps of transportation will be described following the transport path of cans 7 based on the basic construction of the equipment described hereinbefore.

Figure 10:
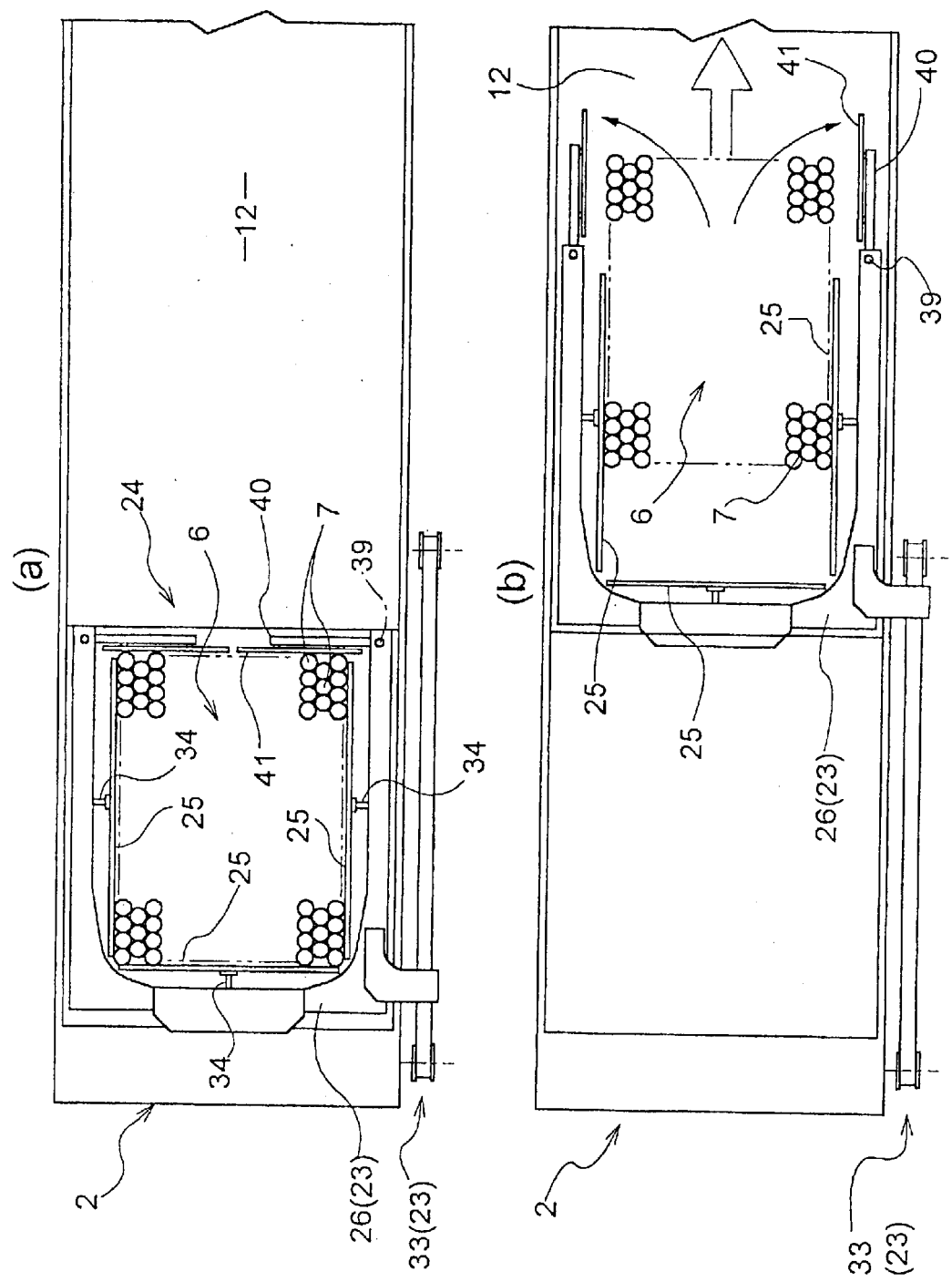
FIG. 10 is an explanatory functional plan view showing a container group transfer mechanism according to the present invention.

A) The transport conveyer 11 transports a can group stack 5 including a plurality of can groups 6 stacked on a pallet 9, onto the lift deck 15 of lift device 14. The lift deck moving mechanism 16 is driven to elevate the can groups 6 in the can group stack 5 stage by stage, to load into the container group transfer mechanism 2 standing by above the lift device 14 (at startup of the container transporting equipment) with the forward-fall preventive device 24 placed in the closed state. (see FIGS. 10(a) and 12(a))

Figure 3:
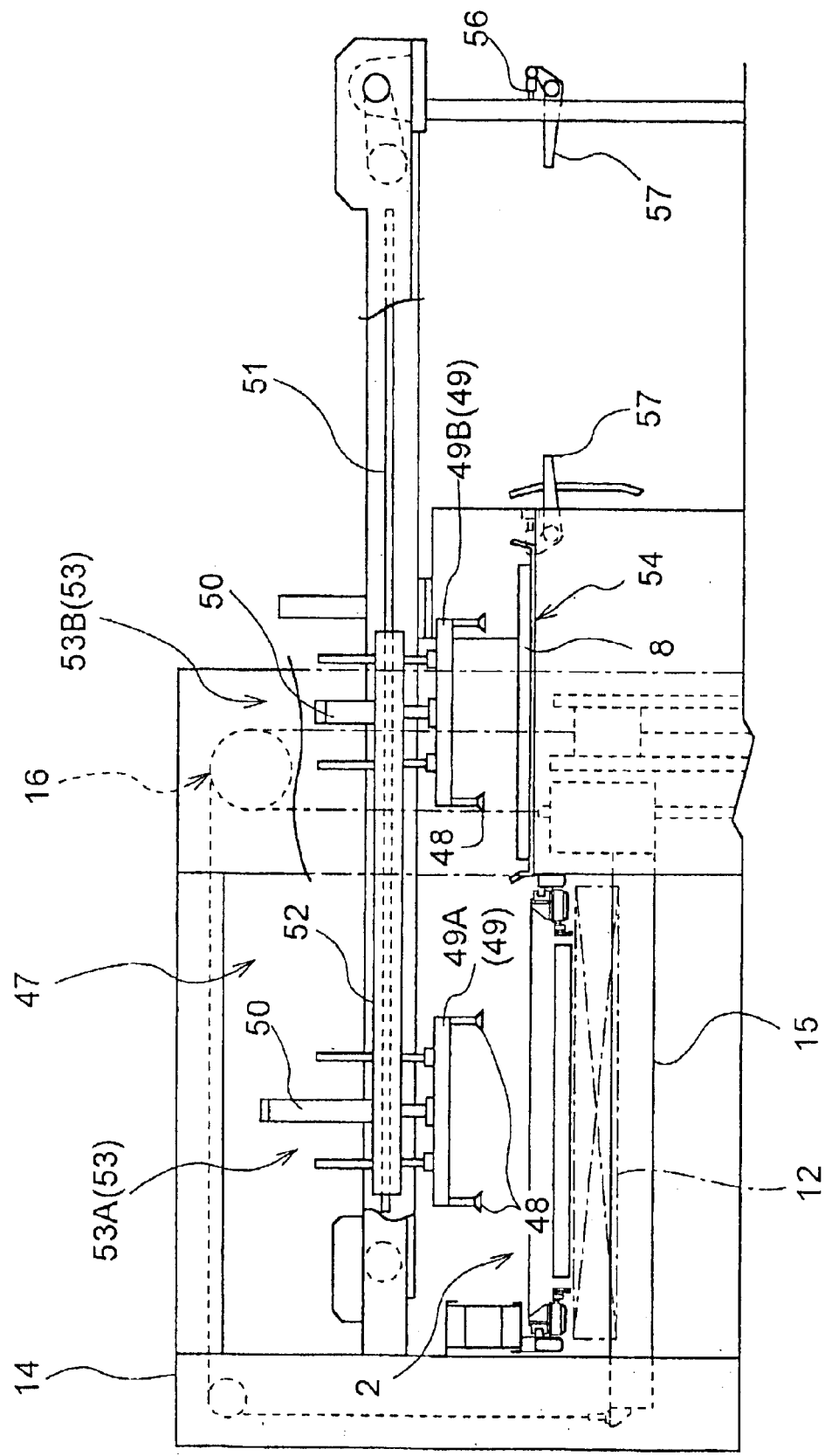
FIG. 3 is an enlarged fragmentary view showing a separates sheet removing device according to the present invention.

B) A separate sheet 8 placed on the uppermost can group 6 elevated by said lift device 14 is removed and transported by a separate sheet removing and transporting device 47 disposed above the lift device 14 as shown in FIGS. 2 and 3.

Said separate sheet removing and transporting device 47 includes separate sheet removing mechanisms 53 each having a vacuum head support 49 with a plurality of vacuum heads 48 for supporting a separate sheet 8 by suction, and a lift cylinder 50 for vertically moving the vacuum head support 49, i.e. a plurality of (two in this embodiment) first and second separate sheet removing mechanisms 53A and 53B mounted on a movable frame 52 movable along a guide rails 51.

To remove a separate sheet 8, the vacuum head support 49A of the first separate sheet removing mechanism 53A standing by above the lift device 14 is lowered. After the separate sheet 8 placed on the uppermost can group 6 is suction-supported by the vacuum head 48, the vacuum head support 49A is raised and the movable frame 52 is moved horizontally to place the first separate sheet removing mechanism 53A above a temporary separate sheet depot 54. The suction of vacuum head 48 is stopped to temporarily place the separate sheet 8 on the temporary separate sheet temporary depot 54.

Subsequently, the first separate sheet removing mechanism 53A is moved above the lift device 14. (At this time, the second separates removing mechanism 53B lies above the temporary separate sheet depot 54.) The vacuum head support 49A is lowered for the vacuum head 48 to suction-support the separate sheet 8 placed on the uppermost can group 6. The vacuum head support 49A is raised to remove the separate sheet 8 from the can group 6. Simultaneously with this removing operation, the vacuum head support 49B of the second separate sheet removing mechanism 53B is lowered to suction-support the separate sheet 8 temporarily placed on the temporary separate sheet depot 54. Then, the vacuum head support 49B is raised and the movable frame 52 is moved horizontally to place the second separate sheet removing mechanism 53B above a discharge lift 55 for discharging separate sheets 8. The suction of vacuum head 48 is stopped to drop the separate sheet 8 to the discharge lift 55. At the same time, the first separate sheet removing mechanism 53A is placed above the temporary separate sheet depot 54, the suction of vacuum head 48 is stopped to temporarily place the separate sheet 8 on the temporary separate sheet depot 54.

The above steps are executed every time the can groups 6 are elevated by one stage by the lift device 14.

By employing the construction having the plurality of separate sheet removing mechanisms 53 as noted above, the moving distance of the individual separate sheet removing mechanisms 53 may be shortened compared with use of one separate sheet removing mechanism 53 for removing separate sheets 8. This improves the separate sheet removing efficiency to improve the efficiency of transporting the can groups 6.

A pair of arms 57 are arranged opposite each other above said discharge lift 55 to be pivotable about axes by extension and contraction of cylinders 56. The separate sheets 8 dropped to the discharge lift 55 are once placed on the arms 57 until the sheets reaches a certain number, and then the cylinders 56 are contracted to swing the arms 57 downward to drop the separate sheets 8 placed on the arms 57 to the discharge lift 55. The discharge lift 55 is lowered to discharge the separate sheets 8. The separate sheets 8 are once placed on the arms 57 in order to save time taken by the operation of the discharge lift 55 for discharging the separate sheets 8. In other words, this is done in order to avoid the discharge operation retarding the operation to remove the separate sheets 8.

C) Simultaneously with the operation to remove the separates sheet 8 on said can group 6, the air cylinders 34 are extended to place the hold bars 25 in contact with the rear end in the pushing direction and the opposite sides of the can group 6 to hold the can group 6 in the frame 26 of the container group transfer mechanism 2. (The forward end of the can group 6 is in contact with the gate members 41.) The frame 26 is moved horizontally toward the airflow conveyer 12 by the belt drive of the servomotor 31 included in the frame moving mechanism 33. (see FIGS. 10(a) and 12(a))

In anticipation of ends of the separate sheet 8 being bent upward or downward, the can group 6 elevated by the lift device 14 is stopped slightly above a bridge plate 58 disposed between the airflow conveyer 12 and lift device 14. Thus, when the cans 7 move from the lift device 14 to the bridge plate 58, the cans 7 could tilt and fall forward easily. However, with the gate members 41 holding the forward position of the can group 6, the cans may be discharged to the airflow conveyer 12 without tumbling. (see FIG. 12)

In this embodiment, an example is described as having the bridge plate 58 disposed between the airflow conveyer 12 and lift device 14 to discharge the can group 6 to the airflow conveyer 12. The discharge may be effected directly from the lift device 14 to the airflow conveyer 12 without using the bridge plate 58.

The above are the basic operating steps of this equipment. In this equipment, a relative speed between the airflow conveyer 12 and pushing device 23 is arranged variable by a speed varying mechanism 62.

As shown in FIG. 4, said speed varying mechanism 62, for example, includes a wind force switching device 64 for switching the degree of wind force of a blower 63, and a change speed device 65 for changing the driving speed of the servomotor 31. Said wind force switching device 64 is operable to vary the rate of air blowout from the air blowout bores 18, thereby to vary the speed of transporting the cans 7 by the airflow conveyer 12. Said change speed device 65 is operable to vary the driving speed of the belt 32, thereby to vary the speed of transporting the cans 7 by the pushing device 23. Thus, the transport speed of the airflow conveyer 12 and the transport speed of the pushing device 23 may be varied separately.

It is therefore possible to equalize the transport speed of the airflow conveyer 12 and the pushing speed of the pushing device 23, of course. The pushing speed of the pushing device 23 may be set faster than the transport speed of the airflow conveyer 12, or the transport speed of the airflow conveyer 12 may be set faster than the pushing speed of the pushing device 23. In this way, the transport function may be varied to suit a transport mode. (see FIG. 4)

As one mode of implementation thereof, for example, the can group 6 held in said frame 26 rides the airflow conveyer 12, with the pushing speed of the pushing device 23 set faster than the transport speed of the airflow conveyer 12. An operation is started to open the turn elements 40 and gate members 41, opening a forward position in the pushing direction of can group 6, to move the can group horizontally on the airflow conveyer 12 forward in the pushing direction. The leading cans 7 of the can group 6 in the frame 26 are never transported faster than the others by the airflow conveyer 12 set slower than the pushing device 23. Thus, the cans 7 may be discharged as maintained in contact with one another onto the airflow conveyer 12 to be transported downstream. (see FIGS. 10(b) and 12(b))

At this time, where the turn elements 40 and gate members 41 are switchable open to discharge the can group upon reaching a position below the upper guide 20 disposed above the airflow conveyer 12, the upper guide 20 can contact the upper end of the can group 6 to prevent a tumbling of the cans 7, thereby enabling a discharge to the airflow conveyer 12 free of a tumbling of the can group 6.

Figure 11:
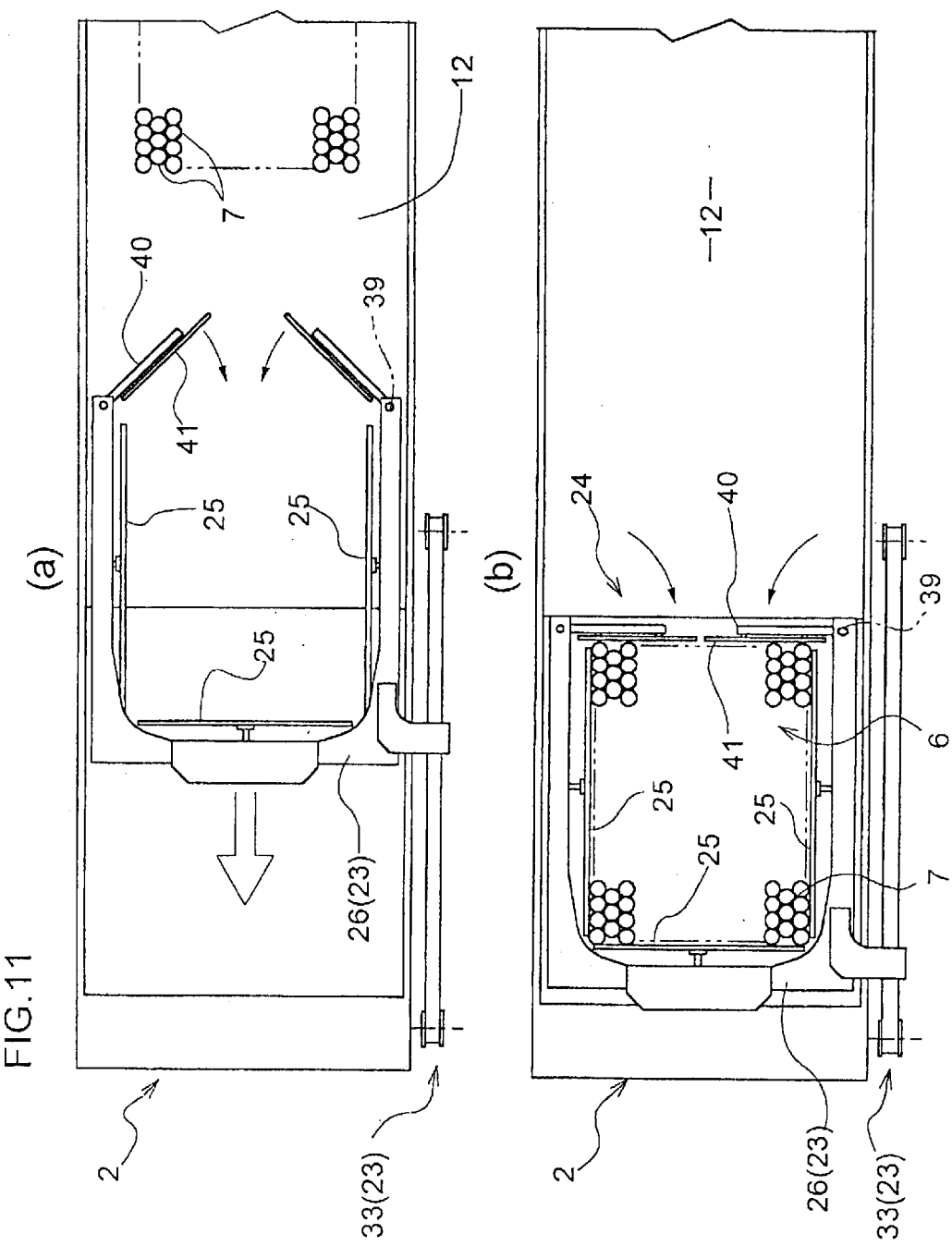
FIG. 11 is an explanatory functional plan view showing the container group transfer mechanism according to the present invention.

D) After the can group 6 is discharged to the airflow conveyer 12, a backward movement is made onto the lift device 14 with an operation started to close the turn elements 40 and gate members 41 and while retracting the hold bars 25. (see FIGS. 11(a) and 13(a))

Then, a can group 6 in the next stage elevated by the lift deck moving mechanism 16 is loaded into the container group transfer mechanism 2. (see FIGS. 11(b) and 13(b))

Thereafter the steps from FIGS. 11(b) to 13(b) are repeated until the can groups 6 are emptied from the pallet 9.

By the time the container group transfer mechanism 2 is brought back onto the lift device 14, a separates sheet 8 remaining on a next can group 6 is removed by the separates sheet removing and transporting device 47.

E) When all can groups 6 have been emptied from the pallet 9, the lift deck 15 is lowered. A pallet transfer device not shown transfers the pallet from inside the lift device 14 toward the pallet discharge conveyer 13. Subsequently, the operations of A) et seq are repeated.

[Other Embodiments]

Other embodiments will be described hereinafter.

Figure 14:
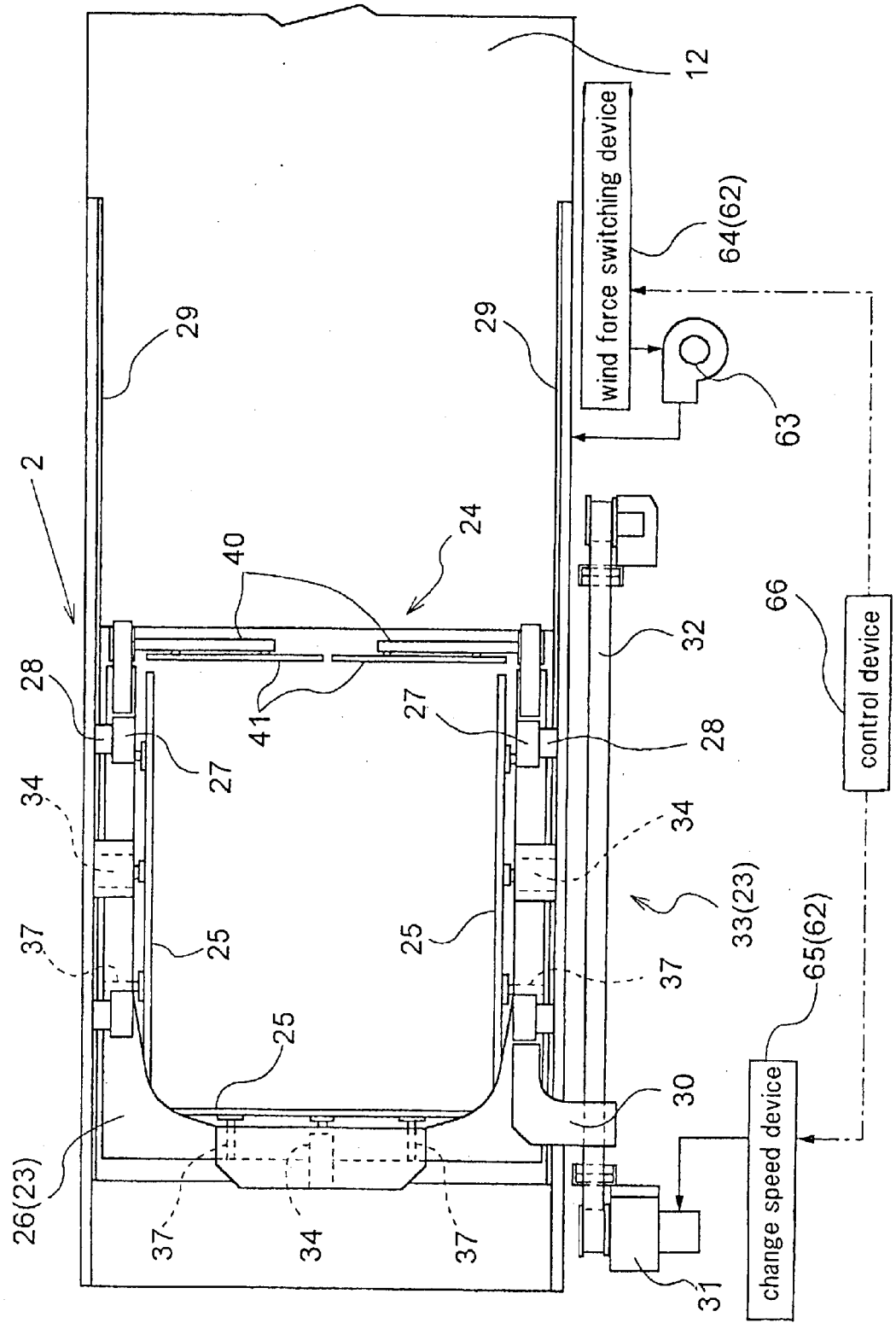
FIG. 14 is a schematic plan view showing a principal portion of container transporting equipment in another embodiment.

<1> The foregoing embodiment has been described in relation to the container transporting equipment having a speed varying mechanism for varying a relative speed between the transport speed of the airflow conveyer and the pushing speed of the pushing device. As shown in FIG. 14, a control device 66 may be provided for varying the transport speed of the airflow conveyer 12 and the pushing speed of the pushing device 23.

With this, for example, the rate of air blowout from the air blowout bores 18 and the driving speed of the belt 32 by the servomotor 31 may be varied automatically. For example, by providing a sensor not shown for detecting presence or a mounting position of the upper guide 20 and a sensor capable of recognizing shapes such as sizes of containers 3 transported, the transport speed of the airflow conveyer 12 and the pushing speed of the pushing device 23 may be varied automatically to a proper relative speed based on information from these sensors even when the mounting state of the upper guide 20 and the shape of containers 3 transported change. Further by providing a sensor or the like for detecting a transporting state of containers 3, the two speeds may be varied according to the transporting state of containers 3 (e.g. crowding and the like of the containers transported).

<2> In the foregoing embodiment, the case of setting the pushing speed of the pushing device faster than the transport speed of the airflow conveyer has been described. As the pushing device moves horizontally forward in the pushing direction on the airflow conveyer, the forward-fall preventive device may be switched to the open state, and the transport speed of the airflow conveyer may be increased the further forward in the direction of transporting the containers. Specifically, the rate of air blowout from the air blowout bores may be set low where the containers are received from the pushing device, and the higher the farther away in the transporting direction from the receiving position.

With this arrangement, the time spent to put the forward-fall preventive device in the open state may be included in the horizontal moving time of the pushing device. This realizes a reduction in the container discharging time compared with the case of discharging the containers onto the airflow conveyer after ending the horizontal movement of the pushing device onto the airflow conveyer.

When, for example, the containers are abruptly discharged to a position of fast transport, the containers tumble easily owing to a difference in relative speed. Where, as in the above arrangement, the transport speed of the airflow conveyer is the faster the farther forward in the transporting direction, the containers may be discharged to a position of moderate transport speed of the airflow conveyer, and the containers received may be transported at gradually increased speed. Thus, the containers may be discharged and transported steadily with little chance of tumbling of the containers.

Figure 15:
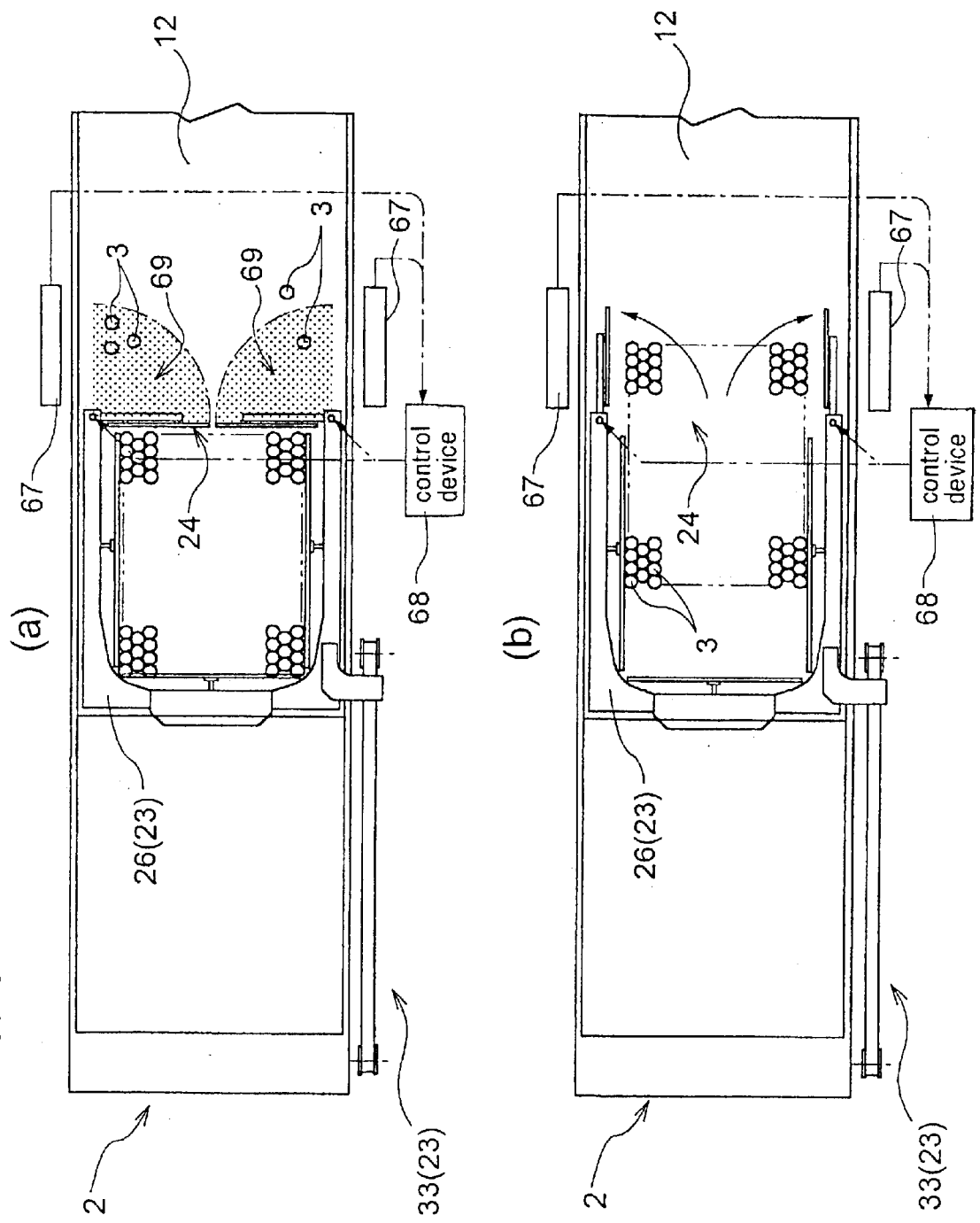
FIG. 15 is an explanatory functional view showing container transporting equipment in a further embodiment.

<3> As shown in FIG. 15, detecting sensors 67 may be provided for detecting presence of containers 3 in regions 69 where an opening operation of the forward-fall preventive device 24 takes place. A control device 68 may be provided for maintaining the forward-fall preventive device 24 in the closed state when the detecting sensors 67 detect the containers 3 present in the opening regions 69, even if the container group 4 is brought by the pushing device 23 onto the airflow conveyer 12, and for switching the forward-fall preventive device 24 to the open state for discharging the container group 4 when an absence of containers 3 is detected.

With this, even if containers 3 discharged at a discharging step of a preceding container group 4 remain in the regions of opening of the forward-fall preventive device 24 under some circumstances, the presence of the containers 3 is detectable by the detecting sensors 67. When the detecting sensors 67 detect the presence of the container 3 in the opening regions, the forward-fall preventive device 24 is maintained in the close state, thereby to avoid the containers 3 being knocked down by the forward-fall preventive device 24 in the opening operation.

<4> In the foregoing embodiment, the gate bars are described as being formed of polyethylene resin. The gate bars are not limited to being formed of polyethylene resin, but may be formed of an elastic material other than polyethylene resin or elastic rubber.

The gate bars may be formed of a material other than an elastic material such as metal or non-elastic resin. The above construction is applicable also to the hold bars 25.

Figure 17:
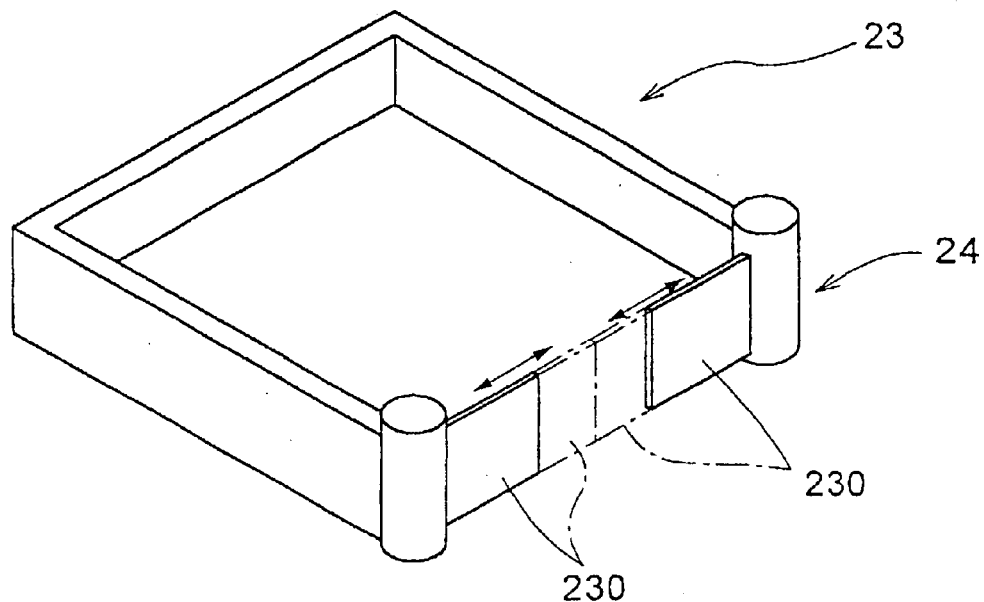
FIG. 17 is a forward-fall preventive device in a further embodiment.

<5> The forward-fall preventive device 24 is not limited to the construction for laterally opening and closing in double-door fashion as described in the foregoing embodiment. As shown in FIG. 17, for example, flexible slide members 230 may be arranged extendible and retractable in a channel-shaped pushing device 23 to switch between a closed state projecting from opposite opening ends of the pushing device 23 for preventing a forward fall of cans 7, and an open state retracted into the pushing device 23 for opening a forward area for allowing the conveyor to transport a can group 4.

Further, instead of being slidable into the pushing device 23, the slide members may be slidable to project left and right from the pushing device 23 to provide the open state.

Figure 18:
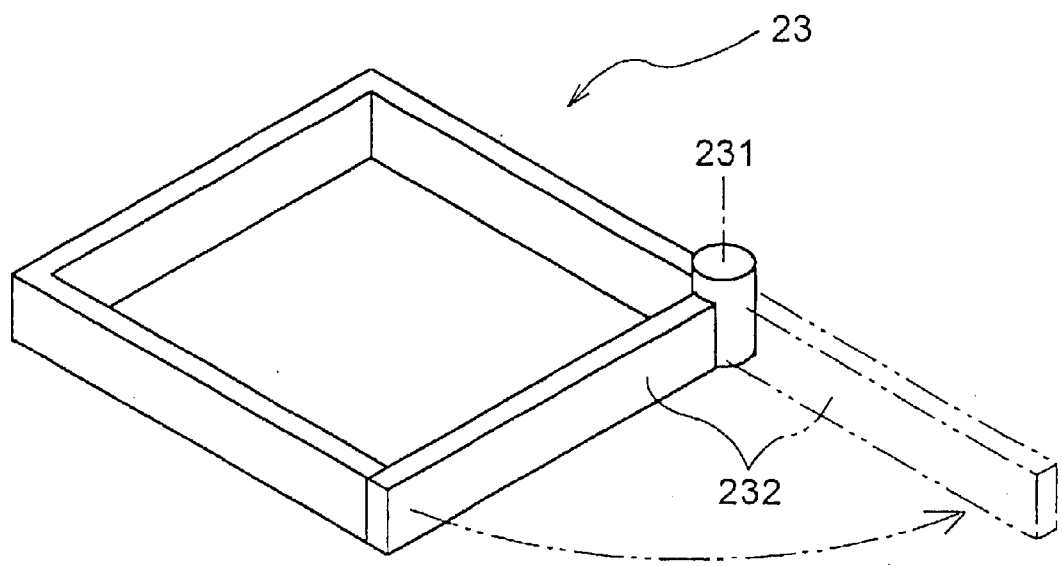
FIG. 18 is a forward-fall preventive device in a further embodiment.
Figure 19:
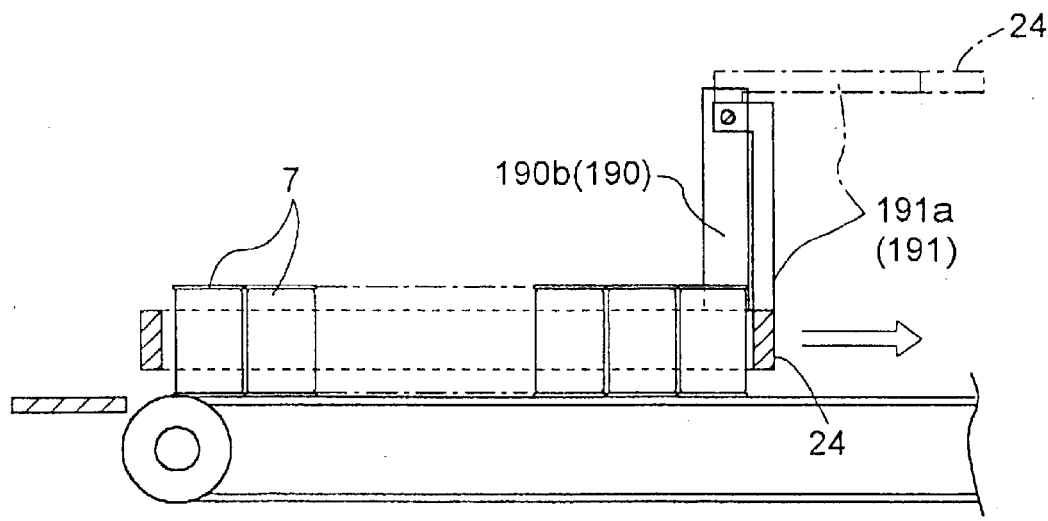
FIG. 19 is a view showing a conventional construction of a forward-fall preventive device.
Figure 20:
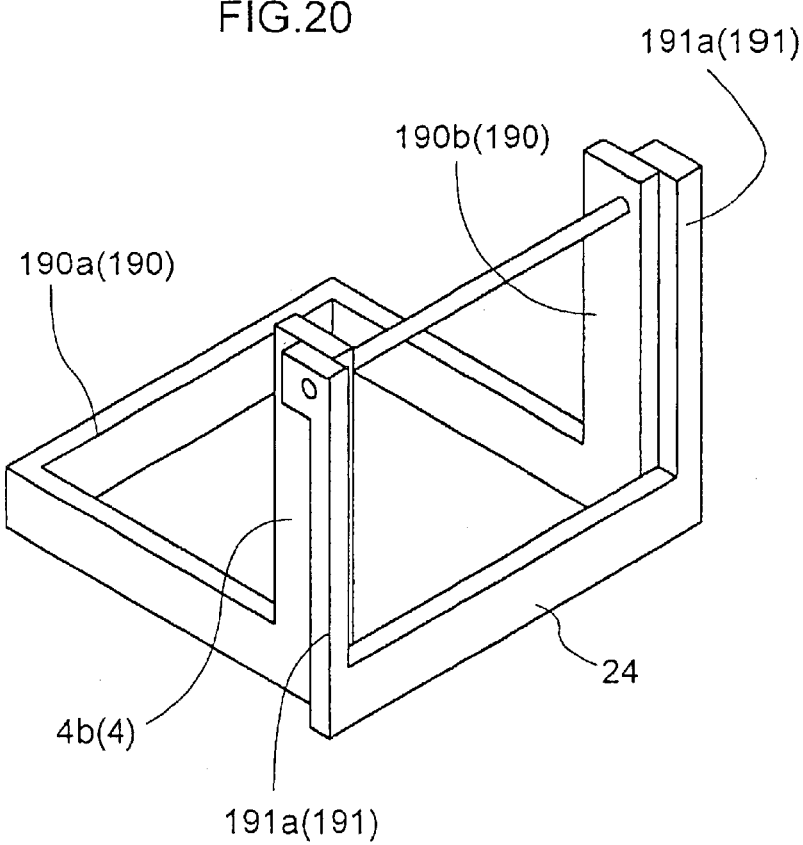
FIG. 20 is a view showing the conventional construction of the forward-fall preventive device.
Figure 21:
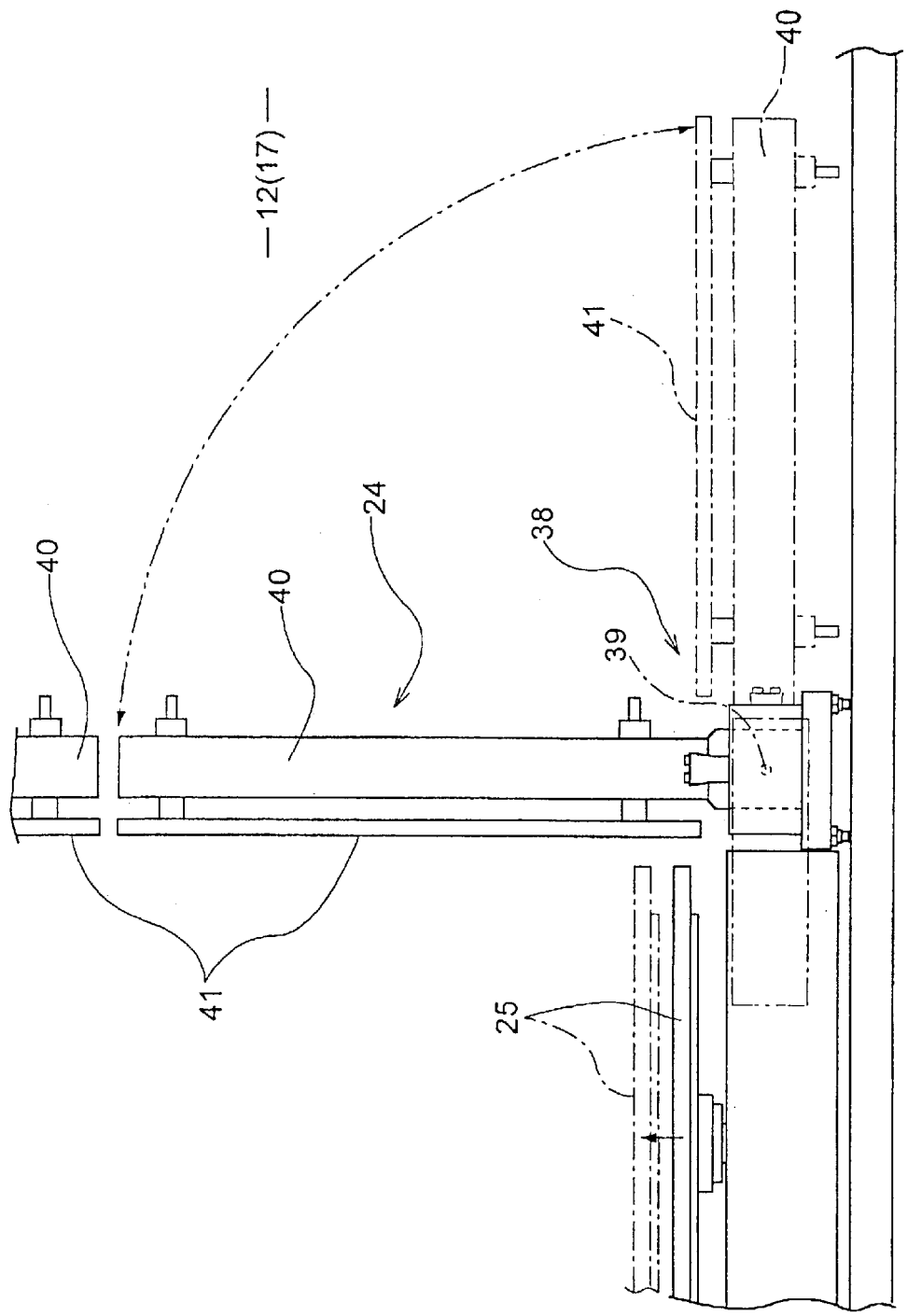
FIG. 21 is a view showing a construction of a pivoting element.

<6> The forward-fall preventive device 24 is not limited to the construction having a pair of right and left turn elements and gate members as described in the foregoing embodiment. As shown in FIG. 18, for example, one plate 232 may be attached through a pivotal axis 231 disposed at one of the opening ends of the pushing device 23 to be switchable between a closed state for preventing a forward fall of cans, and an open state for opening a forward area for allowing the conveyor to transport a can group 4. Though not shown, one slide member may be provided at one of the opening ends of the pushing device 23 to be switchable between a closed state for preventing a forward fall of cans, and an open state with the slide member slid laterally of the pushing device 23 for opening a forward area for allowing the conveyor to transport a can group 4.

<7> The pushing device 23 is not limited to the channel shape as described in the foregoing embodiment. As shown FIG. 22, for example, a pushing plate 23A may extend perpendicular to the moving direction for contacting the rear end, in the moving direction of the conveyer, of a tube group 6 and pushing it to a receiving portion 58 of the conveyer, with a plurality of guides 23B formed of bars disposed at opposite sides. While the guides 23B prevent the can group 6 displacing laterally, the pushing plate 23A moves horizontally to deliver the can group 6 to the receiving portion 58.

<8> The foregoing embodiment has been described as having the buffer mechanism 45 disposed on one end surface of cylinder 44 as shown in FIG. 9. For example, the buffer mechanism 45 such as cushion rubber may be disposed on one end surface of each piston 43A.

The position of the buffer mechanism is not limited to the interior of the air cylinder. The buffer mechanism may be disposed in positions for contacting the turn elements in the open state and close state for absorbing the force of inertia of the turn elements and gate members in an inertial swing.

<9> In the foregoing embodiment, the rotary drive mechansim is in the form of an air cylinder. The rotary drive mechansim is not limited to the air cylinder, but may use a varied motor.

INDUSTRIAL UTILITY

The present invention provides container transporting equipment including a lift device for vertically stacking in stages a plurality of container groups each including a plurality of standing containers arranged and collected in a horizontal direction, and carrying and elevating, stage by stage, said plurality of container groups stacked vertically, provides an air conveyer adjacent the lift device for receiving an uppermost container group elevated by the lift device and transporting the container group horizontally, a pushing device for pushing the uppermost container group onto the adjacent airflow conveyer by contacting the container group at one side thereof and moving horizontally toward the other side, and a forward-fall preventive device switchable between a closed state for lying forwardly in a pushing direction of the container group, as the pushing device moves horizontally, to be capable of preventing a forward fall of containers, and an open state for opening a forward position in the pushing direction of the container group when the container group rides the airflow conveyer to enable a discharge of the container group, to transport the container group effectively.

What is claimed is:

1. A container group transfer mechanism comprising a pushing device for horizontally pushing a container group including a plurality of standing containers arranged and collected in a horizontal direction, by contacting said container group at one side thereof and moving horizontally toward the other side, and a forward-fall preventive device for contacting a forward end in a pushing direction of said container group and switchable between a closed state for lying forwardly in the pushing direction of said container group, as said pushing device moves horizontally, to be capable of preventing a forward fall of said containers, and an open state for opening a forward position in the pushing direction of said container group to enable a discharge of the container group, wherein said forward-fall preventive device has a lateral extension and maintains horizontal posture throughout its movement between the closed state and the open state.

2. Container transporting equipment comprising a lift device for vertically stacking in stages a plurality of container groups each including a plurality of standing containers arranged and collected in a horizontal direction, and carrying and elevating, stage by stage, said plurality of container groups stacked vertically, a conveyer disposed adjacent said lift device for receiving an uppermost container group elevated by said lift device and transporting the container group horizontally, and a container group transfer mechanism having a pushing device for pushing said uppermost container group onto said conveyer by contacting said container group at one side thereof and moving horizontally toward the other side, and a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said conveyer to enable a discharge of said container group, wherein said forward-fall preventive device is laterally switchable.

3. Container transporting equipment as defined in claim 2, wherein said conveyer is an airflow conveyer.

4. A container group transfer method comprising horizontally pushing, with a pushing device, a container group including a plurality of standing containers arranged and collected in a horizontal direction, by contacting said container group at one side thereof and moving horizontally toward the other side, and discharging the container group by opening a forward-fall preventive device for contacting a forward end in a pushing direction of said container group and switchable between a closed state for lying forwardly in the pushing direction of said container group, as said pushing device moves horizontally, to be capable of preventing a forward fall of said containers, and an open state for opening a forward position in the pushing direction of said container group to enable a discharge of the container group, wherein said container group is discharged by laterally opening said forward-fall preventive device, wherein said free-fall preventive device has a lateral extension and maintains horizontal posture throughout its movement between the closed state and the open state.

5. A container group transporting method comprising vertically stacking in stages a plurality of container groups each including a plurality of standing containers arranged and collected in a horizontal direction, and carrying and elevating, stage by stage, with a lift device, said plurality of container groups stacked vertically, horizontally pushing, with a pushing device, an uppermost container group elevated by said lift device by contacting said container group at one side thereof and moving horizontally toward the other side to push said container group onto a conveyer disposed adjacent said lift device for receiving said uppermost container group and transporting the container group horizontally, and discharging said container group by opening a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said conveyer to enable a discharge of said container group, wherein said container group is discharged by laterally opening said forward-fail preventive device.

6. A container group transporting method as defined in claim 5, wherein said conveyer is an airflow conveyer.

7. A container group transfer mechanism comprising a pushing device for horizontally pushing a container group including a plurality of standing containers arranged and collected in a horizontal direction, by contacting said container group at one side thereof and moving horizontally toward the other side, and a forward-fall preventive device for lying forwardly in a pushing direction of said container group, as said pushing device moves horizontally, to be capable of preventing a forward fall of said containers, and an open state for opening a forward position in the pushing direction of said container group to enable a discharge of the container group, wherein said forward-fall preventive device includes turn elements connected for pivotal movement about rotary shafts, rotary drive mechanisms for swinging said turn elements within a predetermined angular range, and gate members fixedly supported by said turn elements for contacting a forward end in a pushing direction of said container group to be capable of preventing a forward fall of the containers, said turn elements being formed to have centers of gravity located closer to said rotary shafts than centers of gravity of said gate members.

8. A container group transfer mechanism as defined in claim 7, wherein said forward-fall preventive device includes buffer mechanisms for absorbing inertial swinging of said gate members.

9. A container group transfer mechanism as defined in claim 7, wherein said rotary drive mechanisms are formed of air cylinders.

10. A container group transfer mechanism as defined in claim 7, wherein said gate members have elastic materials 59 provided in positions contactable with the forward end in the pushing direction of said container group.

11. Container transporting equipment comprising a lift device for vertically stacking in stages a plurality of container groups each including a plurality of standing containers arranged and collected in a horizontal direction, and carrying and elevating, stage by stage, said plurality of container groups stacked vertically, an air conveyer disposed adjacent said lift device for receiving an uppermost container group elevated by said lift device and transporting the container group horizontally, a pushing device for pushing said uppermost container group onto said airflow conveyer by contacting said container group at one side thereof and moving horizontally toward the other side, and a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said airflow conveyer to enable a discharge of said container group herein said container transporting equipment comprises a speed varying mechanism for varying a relative speed between a transport speed of said airflow conveyer and a pushing speed of said pushing device.

12. Container transporting equipment as defined in claim 11, comprising a control device for automatically varying the transport speed of said airflow conveyer and the pushing speed of said pushing device.

13. Container transporting equipment as defined in claim 11, wherein the pushing speed of said pushing device is set faster than the transport speed of said airflow conveyer.

14. Container transporting equipment as defined in claim 11, wherein, as said pushing device moves horizontally forward in the pushing direction on said airflow conveyer, said forward-fall preventive device is switched to the open state, and the transport speed of said airflow conveyer is increased the further forward in the direction of transporting the containers.

15. Container transporting equipment as defined in claim 11, comprising an upper guide disposed above said airflow conveyer for contacting upper ends of the containers to prevent tumbling of the containers being transported, said forward-fall preventive device being switched in the open state when the horizontal movement of said pushing device brings at least the containers forward in the pushing direction of said container group reach a position under said upper guide.

16. Container transporting equipment comprising a lift device for vertically stacking in stages a plurality of container groups each including a plurality of standing containers arranged and collected in a horizontal direction, and carrying and elevating, stage by stage, said plurality of container groups stacked vertically, an air conveyer disposed adjacent said lift device for receiving an uppermost container group elevated by said lift device and transporting the container group horizontally, a pushing device for pushing said uppermost container group onto said airflow conveyer by contacting said container group at one side thereof and moving horizontally toward the other side, and a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said airflow conveyer to enable a discharge of said container group, wherein said container transporting equipment comprises detecting sensors for detecting presence of containers in regions where an opening operation of said forward-fall preventive device takes place, and a control device for maintaining said forward-fall preventive device in the closed state when said detecting sensors detect the containers present in the regions of opening, even if said container group is brought by said pushing device onto said airflow conveyer, and for switching said forward-fall preventive device to the open state for discharging said container group when an absence of containers is detected.

17. A container group transporting method comprising providing a lift device for vertically stacking in stages a plurality of container groups each including a plurality of standing containers arranged and collected in a horizontal direction, and carrying and elevating, stage by stage, said plurality of container groups stacked vertically, horizontally pushing, with a pushing device, an uppermost container group elevated by said lift device by contacting said container group at one side thereof and moving horizontally toward the other side to push said container group onto an airflow conveyer disposed adjacent said lift device for receiving said uppermost container group and transporting the container group horizontally, and discharging said container group by opening a forward-fall preventive device switchable between a closed state for lying forwardly in a pushing direction of said container group, as said pushing device moves horizontally, to be capable of preventing a forward fall of said containers, and an open state for opening a forward position in the pushing direction of said container group when said container group rides said airflow conveyer to enable a discharge of said container group for transport by said airflow conveyer, wherein said container group is discharged by freely varying a relative speed between a transport speed of said airflow conveyer and a pushing speed of said pushing device.

* * * * *